(12) United States Patent
Foley et al.

(10) Patent No.: US 11,740,255 B2
(45) Date of Patent: Aug. 29, 2023

(54) DROPLET DISPENSING

(71) Applicant: ILLUMINA, INC., San Diego, CA (US)

(72) Inventors: Jennifer Olivia Foley, San Diego, CA (US); Darren Segale, San Diego, CA (US); Cyril Delattre, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 678 days.

(21) Appl. No.: 16/616,864

(22) PCT Filed: Nov. 9, 2018

(86) PCT No.: PCT/US2018/060159
§ 371 (c)(1),
(2) Date: Nov. 25, 2019

(87) PCT Pub. No.: WO2019/099306
PCT Pub. Date: May 23, 2019

(65) Prior Publication Data
US 2020/0393481 A1 Dec. 17, 2020

Related U.S. Application Data

(60) Provisional application No. 62/586,087, filed on Nov. 14, 2017.

(51) Int. Cl.
*G01N 35/10* (2006.01)
*B01L 3/02* (2006.01)

(52) U.S. Cl.
CPC ........ *G01N 35/1016* (2013.01); *B01L 3/0265* (2013.01); *B01L 2200/0689* (2013.01);
(Continued)

(58) Field of Classification Search
CPC .............. G01N 35/1016; B01L 3/0265; B01L 2200/0689; B01L 2400/0427; B01L 2400/0622
See application file for complete search history.

(56) References Cited

U.S. PATENT DOCUMENTS 7,329,860 B2  2/2008  Feng et al.
8,039,817 B2  10/2011  Feng et al.
(Continued)

FOREIGN PATENT DOCUMENTS

CN  101084119 A  12/2007
CN  103707643 A  4/2014
(Continued)

*Primary Examiner* — Vishal Pancholi
*Assistant Examiner* — Robert K Nichols, II
(74) *Attorney, Agent, or Firm* — MARSHALL, GERSTEIN & BORUN LLP

(57) ABSTRACT

A system includes a droplet actuator having a droplet-operation gap between top and bottom substrates, a reservoir(s) external to and coupled to the droplet actuator, the reservoir(s) sized for a large-volume fluid, and pressure source(s) external to the droplet actuator and coupled to the at least one reservoir. Operation of the system includes filling the reservoir(s) with a large volume of fluid(s), dispensing droplet(s) of the fluid(s) to the droplet-operation gap using the pressure source(s) as part of performing a droplet operation(s). Movement of the droplet(s) may be effectuated by activating the droplet actuator.

21 Claims, 16 Drawing Sheets

(52) U.S. Cl.
CPC .............. *B01L 2400/0427* (2013.01); *B01L 2400/0622* (2013.01)

(56) References Cited

U.S. PATENT DOCUMENTS

| | | | |
|---|---|---|---|
| 8,236,156 B2* | 8/2012 | Sarrut | B01D 11/0496 |
| | | | 204/450 |
| 8,241,573 B2 | 8/2012 | Banerjee et al. | |
| 8,940,147 B1 | 1/2015 | Bartsch et al. | |
| 9,238,222 B2* | 1/2016 | Delattre | B01L 3/50273 |
| 2006/0231398 A1 | 10/2006 | Sarrut et al. | |
| 2007/0273726 A1 | 11/2007 | Rosenblum et al. | |
| 2009/0272914 A1 | 11/2009 | Feng et al. | |
| 2010/0032293 A1* | 2/2010 | Pollack | B01L 3/502761 |
| | | | 204/600 |
| 2010/0062508 A1 | 3/2010 | Pamula et al. | |
| 2010/0270156 A1 | 10/2010 | Srinivasan et al. | |
| 2010/0307917 A1 | 12/2010 | Srinivasan et al. | |
| 2011/0104816 A1* | 5/2011 | Pollack | B01L 3/502715 |
| | | | 436/174 |
| 2012/0270305 A1 | 10/2012 | Reed et al. | |
| 2014/0008222 A1 | 1/2014 | Srinivasan et al. | |
| 2015/0212043 A1 | 7/2015 | Pollack | |
| 2016/0016170 A1 | 1/2016 | Lay et al. | |
| 2018/0229239 A1* | 8/2018 | Cauley | B01F 23/4105 |

FOREIGN PATENT DOCUMENTS

| | | |
|---|---|---|
| CN | 104603595 A | 5/2015 |
| EP | 1 627 685 A1 | 2/2006 |
| WO | WO-2002/080822 A2 | 10/2002 |
| WO | WO-2006/034359 A1 | 3/2006 |
| WO | WO-2008/101194 A2 | 8/2008 |
| WO | WO-2009/052095 A1 | 4/2009 |
| WO | WO-2009/137415 A2 | 11/2009 |
| WO | WO-2013/179835 A1 | 12/2013 |
| WO | WO-2015/031849 A1 | 3/2015 |
| WO | WO-2017/095845 A1 | 6/2017 |

* cited by examiner

DROPLET DISPENSING

CROSS-REFERENCE TO RELATED APPLICATIONS

This application is a 35 U.S.C. § 371 National Stage of International Patent Application No. PCT/US2018/060159, filed Nov. 9, 2018, which itself claims the benefit of and priority to U.S. Provisional Patent Application No. 62/586,087, filed Nov. 14, 2017, the content of each of which is incorporated by reference herein in its entirety and for all purposes.

BACKGROUND

A droplet actuator, which is one example of a digital fluidics cartridge, may include one or more substrates configured to form a surface or gap for conducting droplet operations. The one or more substrates establish a droplet operations surface or gap for conducting droplet operations and may also include electrodes arranged to conduct the droplet operations. The droplet operations substrate or the gap between the substrates may be coated or filled with a filler fluid that is immiscible with the liquid that forms the droplets. When large volumes of liquids (e.g., reagents) are used, for example, with a droplet actuator, dispensing and maintaining large volumes of liquids can be difficult. For example, in a droplet actuator, a typical on-actuator (or on-cartridge) reservoir for dispensing large volumes of reagents is elevated compared with the height of the droplet operations gap. Consequently, reagents tend to flood uncontrolled from the on-actuator reservoir into the smaller droplet operations gap. Further, a large volume on-actuator (or on-cartridge) reservoir requires a large area of the droplet actuator.

Therefore, there is a need for new approaches to managing large volumes of liquids in digital fluidic applications.

SUMMARY

The shortcomings of pre-existing approaches may be overcome and additional advantages are provided through the provision, in one aspect, of a system. The system comprises a droplet actuator having a droplet-operation gap between top and bottom substrates, at least one reservoir external to and coupled to the droplet actuator, the at least one reservoir being sized for a large-volume fluid, and at least one pressure source external to the droplet actuator and coupled to the at least one reservoir.

In accordance with another aspect, a method is provided. The method comprises filling at least one reservoir of a system with a large volume of one or more fluids, the system further comprising a droplet actuator having a droplet-operation gap between top and bottom substrates thereof, and at least one pressure source external to the droplet actuator and coupled to the at least one reservoir, the at least one reservoir being externally coupled to the droplet actuator and sized for a large-volume fluid. The method further comprises dispensing at least one droplet of the one or more fluids to the droplet-operation gap using the at least one pressure source as part of performing at least one droplet operation.

In accordance with yet another aspect, a method is provided. The method comprises coupling a droplet actuator to at least one reservoir externally coupled to the droplet actuator and sized for a large-volume fluid, filling one or more of the at least one reservoir(s) with a large-volume fluid, activating the droplet actuator, dispensing, after the activating, at least one droplet of the large-volume fluid to an inlet of a droplet-operation gap of the droplet actuator using pressure, the dispensing comprising controlling a flow of the large-volume fluid into the inlet using at least one valve coupled to the inlet, the dispensing including monitoring one or more aspects of the dispensing, and moving the at least one droplet along the droplet-operation gap toward an outlet of the droplet actuator.

BRIEF DESCRIPTION OF THE DRAWINGS

These, and other objects, features and advantages of this application will become apparent from the following detailed description of the various aspects of the application taken in conjunction with the accompanying drawings, in which.

DETAILED DESCRIPTION

Figure 1A:
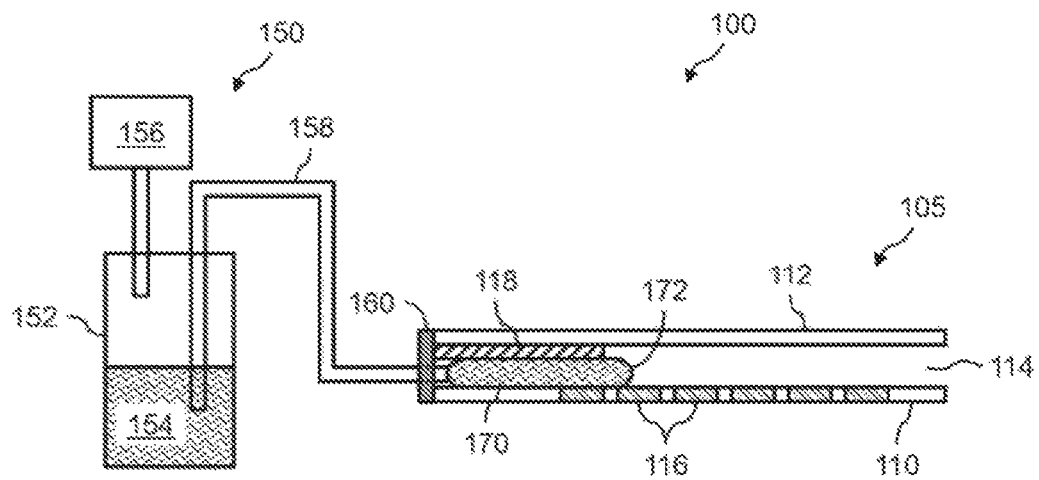
FIGS. 1A and 1B illustrate side views of an example of a microfluidics system that includes a pressure-assisted large-volume reservoir fluidly coupled to the edge or side of a droplet actuator.

Provided in some examples herein include digital fluidics, including pressure-assisted droplet dispensing from digital fluidic cartridges.

Aspects of this application and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the application in detail. It should be understood, however, that the detailed description and the specific examples, while indicating aspects of the application, are given by way of illustration only, and are not by way of limitation. Various substitutions, modifications, additions, and/or arrangements, within the spirit and/or scope of the underlying inventive concepts will be apparent to those skilled in the art from this application.

Approximating language, as used herein throughout the specification and claims, may be applied to modify any quantitative representation that could permissibly vary without resulting in a change in the basic function to which it is related. Accordingly, a value modified by a term or terms, such as "about" or "substantially," is not limited to the precise value specified. In some instances, the approximating language may correspond to the precision of an instrument for measuring the value. As used herein, unless otherwise specified, the terms "about" and "substantially" used with a value, such as measurement, size, etc., means a possible variation of plus or minus five percent of the value.

The terminology used herein is for the purpose of describing particular examples only and is not intended to be limiting of the application. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

As used herein, the term "connected," when used to refer to two physical elements, means a direct connection between the two physical elements. The term "coupled," however, can mean a direct connection or a connection through one or more intermediary elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

As used herein, the term "electrowetting-based droplet actuator" refers to a droplet actuator using electrowetting, which is the modification of the wetting properties of a surface (typically, hydrophobic), activated using an applied voltage.

As used herein, the term "droplet-operation gap" refers to a space between top and bottom substrates of an electrowetting-based droplet actuator.

As used herein interchangeably, the terms "large-volume fluid(s)" and "large volume of fluid(s)" refer to a volume of fluid of greater than 50 microliters to about 50 milliliters.

As used herein, the term "abrupt," when used to describe an increase in a height of a droplet-operation gap refers to a removed portion of a top and/or bottom sub of a droplet actuator creating sidewalls in the remaining top and/or bottom substrate having an angle of about 90 degrees with respect to the top and/or bottom substrate.

"Activate," with reference to one or more electrodes, means affecting a change in the electrical state of the one or more electrodes which, in the presence of a droplet, results in a droplet operation. Activation of an electrode can be accomplished using alternating current (AC) or direct current (DC). Any suitable voltage may be used which effects the desired operation, such as a droplet operation. For example, an electrode may be activated using a voltage which is greater than about 150 V, or greater than about 200 V, or greater than about 250 V, or from about 275 V to about 1000 V, or about 300 V. Where an AC signal is used, any suitable frequency may be employed which effects the desired operation, such as a droplet operation. For example, an electrode may be activated using an AC signal having a frequency from about 1 Hz to about 10 MHz, or from about 10 Hz to about 60 Hz, or from about 20 Hz to about 40 Hz, or about 30 Hz.

"Bead," with respect to beads on a droplet actuator, means any bead or particle that is capable of interacting with a droplet on or in proximity with a droplet actuator.

"Droplet" means a volume of liquid on a droplet actuator. In one example, a droplet is at least partially bounded by a filler fluid. For example, a droplet may be completely surrounded by a filler fluid or may be bounded by filler fluid and one or more surfaces of the droplet actuator. As another example, a droplet may be bounded by filler fluid, one or more surfaces of the droplet actuator, and/or the atmosphere. As yet another example, a droplet may be bounded by filler fluid and the atmosphere. Droplets may, for example, be aqueous or non-aqueous or may be mixtures or emulsions including aqueous and non-aqueous components. Droplets may take a wide variety of shapes; non-limiting examples include generally disc shaped, slug shaped, truncated sphere, ellipsoid, spherical, partially compressed sphere, hemispherical, ovoid, cylindrical, combinations of such shapes, and various shapes formed during droplet operations, such as merging or splitting or formed as a result of contact of such shapes with one or more surfaces of a droplet actuator. In various embodiments, a droplet may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include a reagent, such as water, deionized water, saline solutions, acidic solutions, basic solutions, detergent solutions and/or buffers. A droplet can include nucleic acids, such as DNA, genomic DNA, RNA, mRNA or analogs thereof; nucleotides such as deoxyribonucleotides, ribonucleotides or analogs thereof such as analogs having terminator moieties; enzymes such as polymerases, ligases, recombinases, or transposases; binding partners such as antibodies, epitopes, streptavidin, avidin, biotin, lectins or carbohydrates; or other biochemically active molecules. Other examples of droplet contents include reagents, such as a reagent for a biochemical protocol, such as a nucleic acid amplification protocol, an affinity-based assay protocol, an enzymatic assay protocol, a sequencing protocol, and/or a protocol for analyses of biological fluids. A droplet may include one or more beads.

"Droplet actuator" means a device for manipulating droplets. Certain droplet actuators will include one or more substrates arranged with a droplet operations gap therebetween and electrodes associated with (e.g., layered on, attached to, and/or embedded in) the one or more substrates and arranged to conduct one or more droplet operations. For example, certain droplet actuators will include a base (or bottom) substrate, droplet operations electrodes associated with the substrate, one or more dielectric layers atop the substrate and/or electrodes, and optionally one or more hydrophobic layers atop the substrate, dielectric layers and/or the electrodes forming a droplet operations surface. A top substrate may also be provided, which is separated from the droplet operations surface by a gap, commonly referred to as a droplet operations gap. Various electrode arrangements on the top and/or bottom substrates are discussed in the above-referenced patents and applications and certain novel electrode arrangements are discussed in the description of the present application. During droplet operations it may be desirable that droplets remain in continuous contact or frequent contact with a ground or reference electrode. A ground or reference electrode may be associated with the top substrate facing the gap, the bottom substrate facing the gap, in the gap. Where electrodes are provided on both substrates, electrical contacts for coupling the electrodes to a droplet actuator instrument for controlling or monitoring the electrodes may be associated with one or both plates. In some cases, electrodes on one substrate are electrically coupled to the other substrate so that only one substrate is in contact with the droplet actuator. In one embodiment, a conductive material (e.g., an epoxy, such as MASTER BOND™ Polymer System EP79, available from Master Bond, Inc., Hackensack, N.J.) provides the electrical connection between electrodes on one substrate and electrical paths on the other substrates, e.g., a ground electrode on a top substrate may be coupled to an electrical path on a bottom substrate by such a conductive material. Where multiple substrates are used, a spacer may be provided between the substrates to determine the height of the gap therebetween and define on-actuator dispensing reservoirs. The one or more openings may in some cases be aligned for interaction with one or more electrodes, e.g., aligned such that liquid flowed through the opening will come into sufficient proximity with one or more droplet operations electrodes to permit a droplet operation to be effected by the droplet operations electrodes using the liquid. The base (or bottom) and top substrates may in some cases be formed as one integral component. One or more reference electrodes may be provided on the base (or bottom) and/or top substrates and/or in the gap. In various embodiments, the manipulation of droplets by a droplet actuator may be electrode mediated, e.g., electrowetting mediated or dielectrophoresis mediated or Coulombic force mediated. Examples of techniques for controlling droplet operations that may be used in the droplet actuators of the present application include using devices that induce hydrodynamic fluidic pressure, such as those that operate on the basis of mechanical principles (e.g., external syringe pumps, pneumatic membrane pumps, vibrating membrane pumps, vacuum devices, centrifugal forces, piezoelectric/ultrasonic pumps and acoustic forces. Note that either a flowrate-control pumping device (e.g., a syringe pump) or pressure-control pumping device (e.g., a pressure controller) could be used. Further examples include electrical or magnetic principles (e.g., electroosmotic flow, electrokinetic pumps, ferrofluidic plugs, electrohydrodynamic pumps, attraction or repulsion using magnetic forces and magnetohydrodynamic pumps); thermodynamic principles (e.g., gas bubble generation/phase-change-induced volume expansion); other kinds of surface-wetting principles (e.g., electrowetting, and opto-electrowetting, as well as chemically, thermally, structurally and radioactively induced surface-tension gradients); gravity; surface tension (e.g., capillary action); electrostatic forces (e.g., electroosmotic flow); centrifugal flow (substrate disposed on a compact disc and rotated); magnetic forces (e.g., oscillating ions causes flow); magnetohydrodynamic forces; and vacuum or pressure differential. In certain embodiments, combinations of two or more of the foregoing techniques may be employed to conduct a droplet operation in a droplet actuator of the present application. Similarly, one or more of the foregoing may be used to deliver liquid into a droplet operations gap, e.g., from a reservoir in another device or from an external reservoir of the droplet actuator (e.g., a reservoir associated with a droplet actuator substrate and a flow path from the reservoir into the droplet operations gap). Droplet operations surfaces of certain droplet actuators of the present application may be made from hydrophobic materials or may be coated or treated to make them hydrophobic. For example, in some cases some portion or all of the droplet operations surfaces may be derivatized with low surface-energy materials or chemistries, e.g., by deposition or using in situ synthesis using compounds such as poly- or per-fluorinated compounds in solution or polymerizable monomers. In some cases, the droplet operations surface may include a hydrophobic coating. Moreover, in some embodiments, the top substrate of the droplet actuator includes an electrically conducting organic polymer, which is then coated with a hydrophobic coating or otherwise treated to make the droplet operations surface hydrophobic. For example, the electrically conducting organic polymer that is deposited onto a plastic substrate may be poly(3,4-ethylenedioxythiophene) poly(styrenesulfonate) (PEDOT: PSS). One or both substrates may be fabricated using, for example, a printed circuit board (PCB), glass, indium tin oxide (ITO)-coated glass, and/or semiconductor materials as the substrate.

"Droplet operation" means any manipulation of a droplet on a droplet actuator. A droplet operation may, for example, include: loading a droplet into the droplet actuator; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a droplet actuator; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. Droplet operations may be electrode-mediated. In some cases, droplet operations are further facilitated by the use of hydrophilic and/or hydrophobic regions on surfaces and/or by physical features, such as obstacles, gap height changes, or surface indentations. Impedance or capacitance sensing or imaging techniques may sometimes be used to determine or confirm the outcome of a droplet operation. Impedance or capacitance sensing or imaging techniques may sometimes be used to determine or confirm the outcome of a droplet operation. Generally speaking, the sensing or imaging techniques may be used to confirm the presence or absence of a droplet at a specific electrode. For example, the presence of a dispensed droplet at the destination electrode following a droplet dispensing operation confirms that the droplet dispensing operation was effective. Similarly, the presence of a droplet at a detection spot at an appropriate step in an assay protocol may confirm that a previous set of droplet operations has successfully produced a droplet for detection. Droplet transport time can be quite fast. For example, in various embodiments, transport of a droplet from one electrode to the next may exceed about 1 sec, or about 0.1 sec, or about 0.01 sec, or about 0.001 sec. In one embodiment, the electrode is operated in AC mode but is switched to DC mode for imaging. It is sometimes helpful (though not an absolute requirement) for conducting droplet operations for the footprint area of droplet to be similar to electrowetting area; in other words, 1×-, 2×- 3×-droplets are usefully controlled operated using 1, 2, and 3 electrodes, respectively. If the droplet footprint is greater than number of electrodes available for conducting a droplet operation at a given time, the difference between the droplet size and the number of electrodes should, for example, not be greater than 1; in other words, a 2× droplet is usefully controlled using 1 electrode and a 3× droplet is usefully controlled using 2 electrodes. When droplets include beads, it is useful for droplet size to be equal to the number of electrodes controlling the droplet, e.g., transporting the droplet.

"Filler fluid" means a fluid associated with a droplet operations substrate of a droplet actuator, which fluid is sufficiently immiscible with a droplet phase to render the droplet phase subject to electrode-mediated droplet operations. For example, the droplet operations gap of a droplet actuator may be, for example, filled with a filler fluid. The filler fluid may, for example, be or include a low-viscosity oil, such as silicone oil or hexadecane filler fluid. The filler fluid may be or include a halogenated oil, such as a fluorinated or perfluorinated oil. The filler fluid may fill the entire gap of the droplet actuator or may coat one or more surfaces of the droplet actuator. Filler fluids may be conductive or non-conductive. Filler fluids may be selected to improve droplet operations and/or reduce loss of reagent or target substances from droplets, improve formation of microdroplets, reduce cross contamination between droplets, reduce contamination of droplet actuator surfaces, reduce degradation of droplet actuator materials, etc. Fluorinated oils may in some cases be doped with fluorinated surfactants, e.g., Zonyl FSO-100 (Sigma-Aldrich) and/or others. A filler fluid may be, for example, a liquid. In some embodiments, a filler gas can be used instead of a liquid.

"Reservoir" means an enclosure or partial enclosure configured for holding, storing, and/or supplying liquid. A droplet actuator system of the present application may include on-cartridge reservoirs and/or off-cartridge reservoirs. On-cartridge reservoirs may, for example, include (1) on-actuator reservoirs, which are reservoirs in the droplet operations gap or on the droplet operations surface; (2) off-actuator reservoirs, which are reservoirs on the droplet actuator cartridge, but outside the droplet operations gap, and not in contact with the droplet operations surface; or (3) hybrid reservoirs which have on-actuator regions and off-actuator regions. An example of an off-actuator reservoir is a reservoir in the top substrate. An off-actuator reservoir may be, for example, in fluid communication with an opening or flow path arranged for flowing liquid from the off-actuator reservoir into the droplet operations gap, such as into an on-actuator reservoir. An off-cartridge reservoir may be a reservoir that is not part of the droplet actuator cartridge at all, but which flows liquid to some portion of the droplet actuator cartridge. For example, an off-cartridge reservoir may be part of a system or docking station to which the droplet actuator cartridge is coupled during operation. Similarly, an off-cartridge reservoir may be a reagent storage container or syringe which is used to force fluid into an on-cartridge reservoir or into a droplet operations gap. A system using an off-cartridge reservoir will typically include a fluid passage means whereby liquid may be transferred from the off-cartridge reservoir into an on-cartridge reservoir or into a droplet operations gap.

The terms "top," "bottom," "over," "under," and "on" are used throughout the description with reference to the relative positions of components of the droplet actuator, such as relative positions of top and bottom substrates of the droplet actuator. It will be appreciated that the droplet actuator is functional regardless of its orientation in space.

When a liquid in any form (e.g., a droplet or a continuous body, whether moving or stationary) is described as being "on", "at", or "over" an electrode, array, matrix or surface, such liquid could be either in direct contact with the electrode/array/matrix/surface, or could be in contact with one or more layers or films that are interposed between the liquid and the electrode/array/matrix/surface. In one example, filler fluid can be considered as a film between such liquid and the electrode/array/matrix/surface.

When a droplet is described as being "on" or "loaded on" a droplet actuator, it should be understood that the droplet is arranged on the droplet actuator in a manner which facilitates using the droplet actuator to conduct one or more droplet operations on the droplet, the droplet is arranged on the droplet actuator in a manner which facilitates sensing of a property of or a signal from the droplet, and/or the droplet has been subjected to a droplet operation on the droplet actuator.

The terms "fluidics cartridge," "digital fluidics cartridge," "droplet actuator," and "droplet actuator cartridge" as used throughout the description can be synonymous.

As used herein, the term "fluidly coupled" refers to two or more members for carrying fluid that are coupled together to form a path for fluid to flow.

Digital microfluidic technology is based on the use of "electrowetting" to precisely manipulate droplets of fluid on a surface. The term "electrowetting" describes the ability of an applied voltage to modulate the "wettability" of a surface. Aqueous droplets naturally "bead-up" on a hydrophobic surface but a voltage applied between a droplet and an insulated electrode can cause the droplet to spread on the surface. Digital microfluidics harnesses the electrowetting effect to precisely manipulate droplets within a sealed microfluidic cartridge (also called a "Lab-on-a-chip"). Electrical signals are applied to an array of electrodes to control the size and position of each droplet. Droplets are transferred between adjacent electrodes by removing voltage from one electrode and applying it to the next one. The same processes can be used to dispense, merge or split droplets using electrical signals. Fully-programmable fluid handling is thereby achieved without the use of any pumps, valves or channels.

Presented herein is pressure-assisted dispensing for digital fluidic applications. For example, in one aspect, presented is pressure-assisted off-cartridge reservoirs for dispensing and maintaining large reagent volumes with respect to a droplet actuator. In some embodiments, pressure-assisted large-volume reservoirs are fluidly coupled to the edge or side of a droplet actuator (i.e., edge-coupled (or side-coupled) pressure-assisted reservoirs). In other embodiments, pressure-assisted large-volume reservoirs are fluidly coupled to the bottom of a droplet actuator (i.e., bottom-coupled pressure-assisted reservoirs). In yet other embodiments, pressure-assisted large-volume reservoirs are fluidly coupled to the top of a droplet actuator (i.e., top-coupled pressure-assisted reservoirs). Pressure assist could be completed in an oil or an air environment.

An aspect of the pressure-assisted dispensing for digital fluidic applications is that a large-volume reservoir can be coupled to a droplet actuator without risk of flooding the droplet operations gap.

Another aspect of the pressure-assisted dispensing for digital fluidic applications is that a large-volume reservoir can be separate from and located far from a droplet actuator and therefore not consume precious real estate on the droplet actuator.

Yet another aspect of the pressure-assisted dispensing for digital fluidic applications is that arrangements of on-board droplet operations electrodes can serve as small on-cartridge reservoirs within the droplet actuator, wherein the on-cartridge reservoirs can be pressure-assisted.

Reference is made below to the drawings, which are not drawn to scale for ease of understanding, wherein the same reference numbers are used throughout different figures to designate the same or similar components.

Figure 1B:
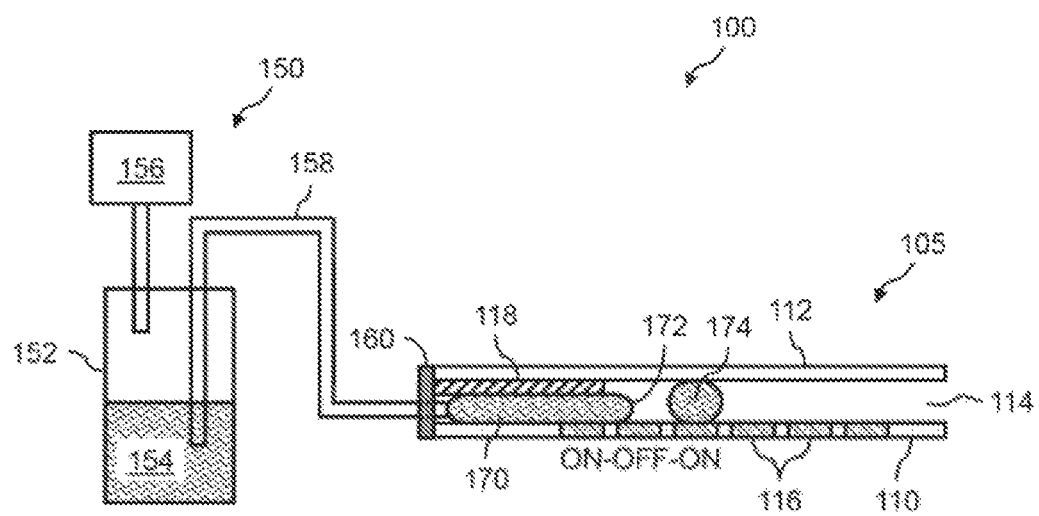

FIGS. 1A and 1B illustrate side views of an example of a microfluidics system 100 that includes a pressure-assisted large-volume reservoir fluidly coupled to the edge or side of a droplet actuator. Namely, microfluidics system 100 includes a droplet actuator 105 used in combination with a reservoir system 150 that includes a pressure-assisted large-volume reservoir fluidly coupled to the edge or side of droplet actuator 105.

Droplet actuator 105 includes a bottom substrate 110 and a top substrate 112 that are separated by a droplet operations gap 114. Droplet operations gap 114 can contain filler fluid (not shown). The filler fluid is, for example, low-viscosity oil, such as silicone oil or hexadecane filler fluid. Bottom substrate 110 may be, for example, a printed circuit board (PCB). Bottom substrate 110 may include an arrangement of droplet operations electrodes 116 (e.g., electrowetting electrodes). Top substrate 112 may be, for example, a glass or plastic substrate. Top substrate 112 may include a ground reference plane or electrode (not shown). Droplet operations are conducted atop droplet operations electrodes 116 on a droplet operations surface.

Reservoir system 150 supplies liquid, such as reagents, to droplet actuator 105. Reservoir system 150 is a pressure-assisted large-volume reservoir. Reservoir system 150 includes, for example, a vessel 152 that holds a volume of liquid 154. Vessel 152 can be, for example, a glass or plastic vessel. Liquid 154 can be, for example, reagent solution. A pressure source 156 is fluidly coupled to vessel 152. Pressure source 156 is a constant pressure source. Pressure source 156 can be any type of positive pressure and/or negative pressure pump, such as, but not limited to, a syringe pump. Note that either a flowrate-control pumping device (e.g., a syringe pump) or pressure-control pumping device (e.g., a pressure controller) could be used. It is possible to convert one to the other by adding a pressure sensor for the former and flow sensor for the latter, but they work on fundamentally different principle. Vessel 152 is fluidly coupled to the edge of droplet actuator 105 via a capillary tube 158. In one example, capillary tube 158 is a Teflon-coated glass capillary tube. Capillary tube 158 is fluidly coupled to the edge or side of droplet actuator 105. Namely, the tip of capillary tube 158 is fitted between bottom substrate 110 and top substrate 112 and arranged with respect to droplet operations electrodes 116. A seal 160, such as an epoxy seal, is provided at the interface of capillary tube 158 and droplet actuator 105 to prevent leakage. Optionally, a spacer 118 is provided in droplet operations gap 114 near the entry point of capillary tube 158. Spacer 118 is positioned against top plate 112.

Figure 2:
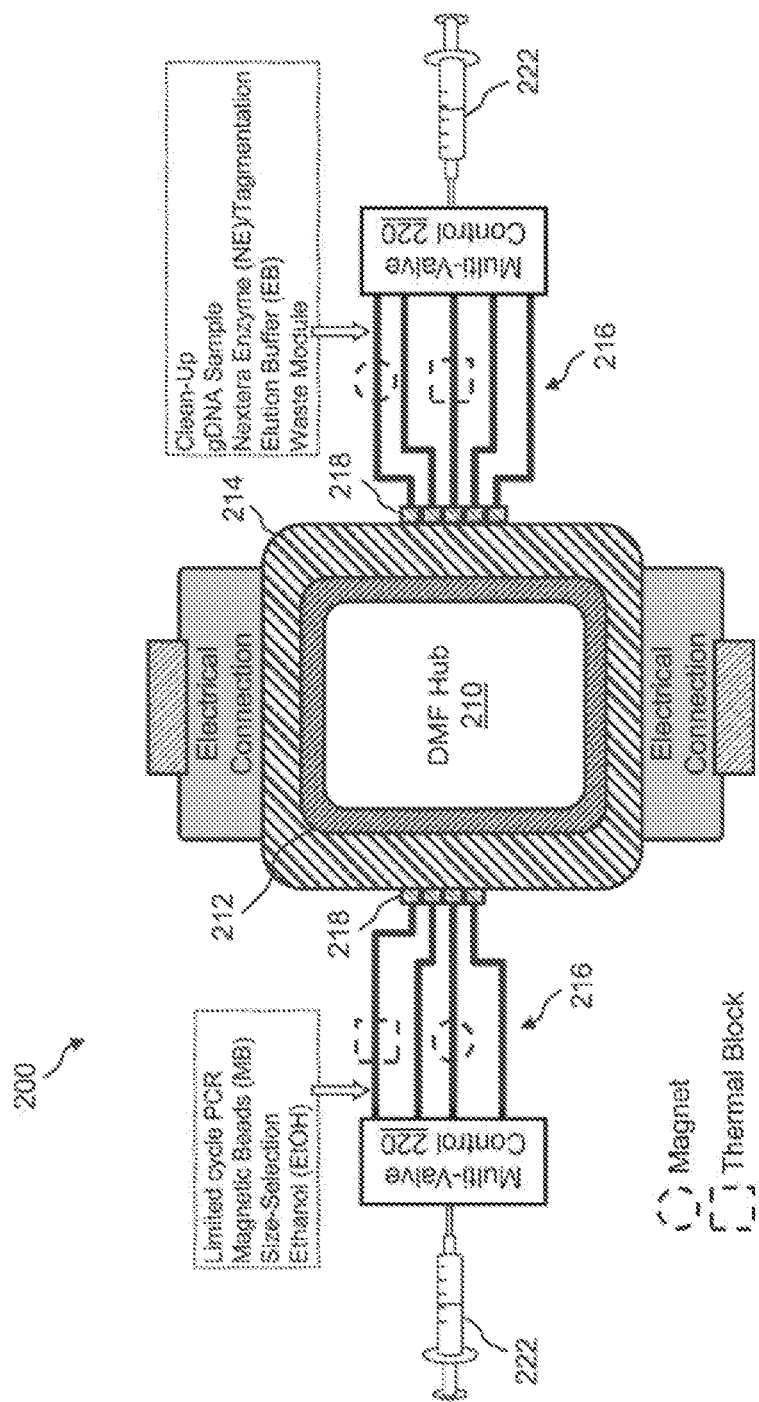
FIG. 2 illustrates a plan view of an example of an integrated microfluidics system for preparing DNA libraries for sequencing, wherein pressure-assisted reservoirs are edge-coupled to the integrated the microfluidics system.

In one example, a liquid slug 170 (e.g., slug of reagent) is dispensed under pressure into droplet operations gap 114. Using pressure source 156, the pressure is controlled such that the meniscus 172 of liquid slug 170 is at the same position when dispensed from capillary tube 158. Further, spacer 118 is used to shrink the inlet vertically and/or horizontally and thereby size liquid slug 170. In this configuration, vessel 152 can be located far from droplet actuator 105. FIG. 1A shows liquid slug 170 in position at the first droplet operations electrode 116 and ready to dispense droplets therefrom. FIG. 1B shows a sequence of droplet operations electrodes 116 for dispensing (via droplet operations) a droplet 174 from liquid slug 170. All the while, the volume of liquid slug 170 is replenished from reservoir system 150 and the position of meniscus 172 of liquid slug 170 is maintained. FIG. 2 below shows an example of a system that uses the edge- or side-coupling technique described in FIGS. 1A and 1B.

FIG. 2 illustrates a plan view of an example of an integrated microfluidics system 200 for preparing DNA libraries for sequencing, wherein pressure-assisted reservoirs are edge-coupled to integrated microfluidics system 200. For example, integrated microfluidics system 200 includes mechanisms for fluidly coupling large-volume reservoirs to the edges or sides of a central digital microfluidic (DMF) hub 210, i.e., the digital fluidics cartridge. Integrated microfluidics system 200 is, for example, a system for preparing DNA libraries for sequencing. Integrated microfluidics system 200 features central DMF hub 210 for integrating multiple reagent and sample preparation modules, magnets and thermal blocks coupled to module tubing for sample preparation, and multi-valve syringe pumps for liquid handling.

Figure 3A:
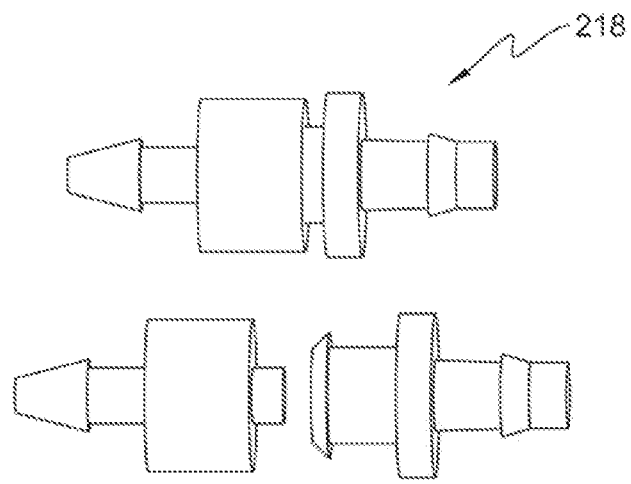
FIG. 3A shows examples of fittings used in the integrated microfluidics system of FIG. 2.

Central DMF hub 210 is fitted into a compression frame 212 which is fitted into a manifold frame 214. Multiple capillary tubes 216 are fluidly coupled to the sides of manifold frame 214. For example, a first set of four capillary tubes 216 supplies one side of manifold frame 214. A second set of five capillary tubes 216 supplies another side of manifold frame 214. In one example, capillary tubes 216 are coupled to manifold frame 214 via fittings, for example, CapTite™ fittings 218 (available from LabSmith, Inc., Livermore, Calif.). Examples of CapTite™ fittings 218 are shown in FIG. 3A. Each set of capillary tubes 216 is supplied by a multi-valve control 220. Each of the multi-valve controls 220 is supplied by any type of positive pressure and/or negative pressure pump, such as a syringe pump 222.

Figure 3B:
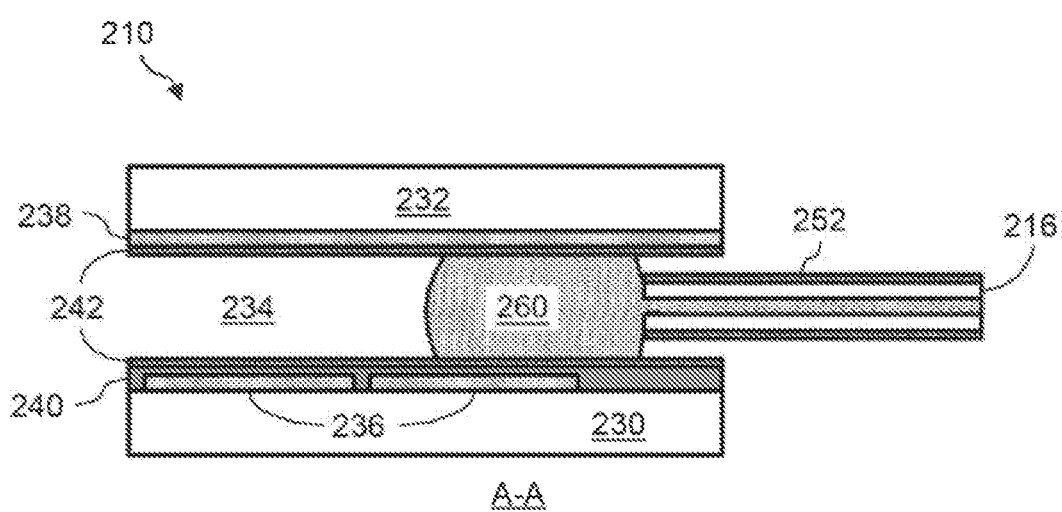
FIG. 3B shows a cross-sectional view of the integrated microfluidics system taken along line AA of FIG. 2.

FIG. 2 also shows a cross-sectional view of a portion of integrated microfluidics system 200 taken along line A-A. Namely, a cross-sectional view of the DMF-capillary interface of integrated microfluidics system 200. However, FIG. 3B shows a more detailed cross-sectional view of integrated microfluidics system 200 taken along line A-A. Namely, FIG. 3B shows that central DMF hub 210 includes a bottom substrate 230 and a top substrate 232 that are separated by a droplet operations gap 234. Droplet operations gap 234 can contain filler fluid (not shown). Bottom substrate 230 may be, for example, a PCB. Bottom substrate 110 may include an arrangement of droplet operations electrodes 236 (e.g., electrowetting electrodes). A parylene coating 240 is atop droplet operations electrodes 236. Top substrate 232 may be, for example, a glass or plastic substrate. Top substrate 232 may include a ground reference electrode 238. In one example, droplet operations electrodes 236 and ground reference electrode 238 are formed of indium tin oxide (ITO). Further, an optional non-stick coating 242 may be on both the side of bottom substrate 110 and the side of top substrate 232 that is facing droplet operations gap 234. Droplet operations are conducted atop droplet operations electrodes 236 on a droplet operations surface. A capillary tube 216 is arranged with respect to the edge of central DMF hub 210; namely, between bottom substrate 110 and top substrate 232 and in relation to a first droplet operations electrode 236. In one example, capillary tube 216 is a glass capillary tube whose outer surface has a Teflon coating 252. FIG. 3B shows a liquid 260 being pumped into central DMF hub 210 and forming a droplet.

Figure 4A:
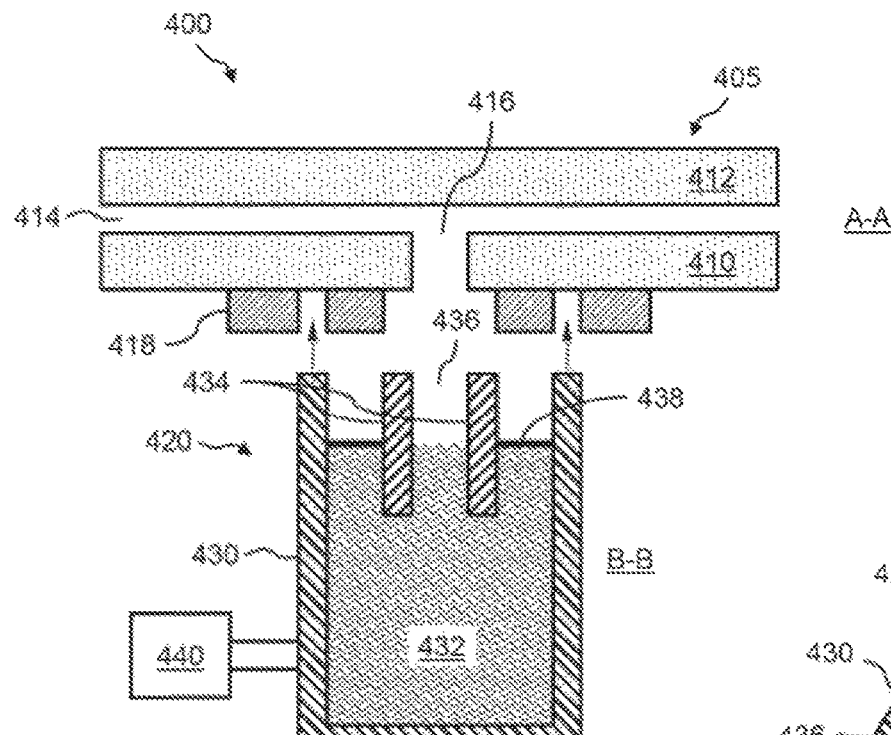
FIGS. 4A, 4B, and 4C illustrate various views of an example of a microfluidics system that includes a pressure-assisted large-volume reservoir fluidly coupled to the bottom of a droplet actuator.
Figure 4C:
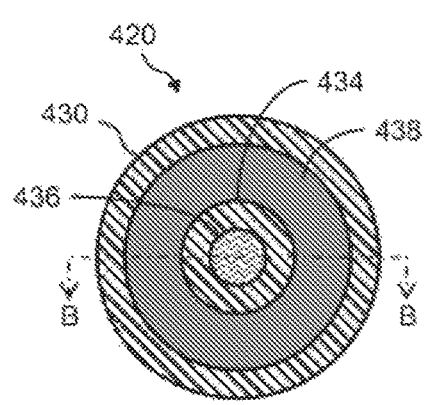
Figure 4B:
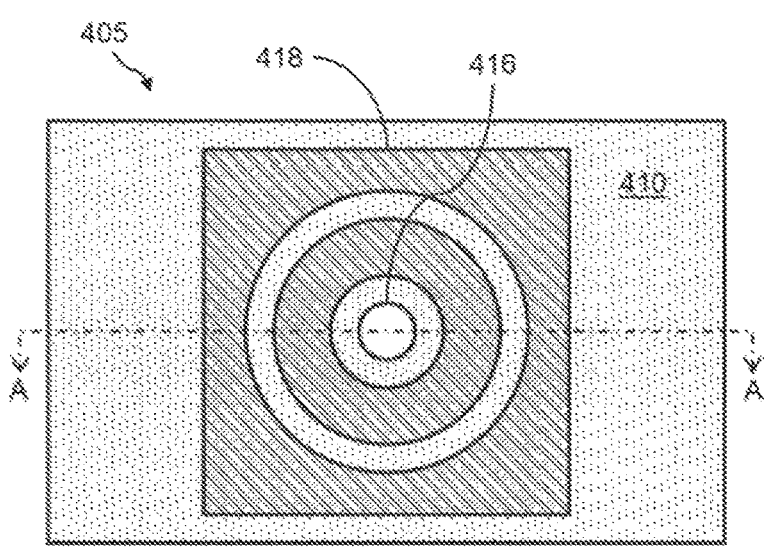

FIGS. 4A, 4B, and 4C illustrate various views of an example of a microfluidics system 400 that includes a pressure-assisted large-volume reservoir fluidly coupled to the bottom of a droplet actuator. Namely, microfluidics system 400 includes a droplet actuator 405 used in combination with a reservoir system 420 that includes a pressure-assisted large-volume reservoir fluidly coupled to the bottom of droplet actuator 405.

Droplet actuator 405 includes a bottom substrate 410 and a top substrate 412 that are separated by a droplet operations gap 414. Droplet operations gap 414 can contain filler fluid (not shown). Bottom substrate 410 may be, for example, a PCB or a glass substrate. Bottom substrate 410 may include an arrangement of droplet operations electrodes (not shown). Top substrate 412 may be, for example, a glass or plastic substrate. Top substrate 412 may include a ground reference plane or electrode (not shown). A loading port 416 (e.g., a through-hole) is provided in bottom substrate 410. An alignment feature 418 is provided on the underside of bottom substrate 410 and in relation to loading port 416. Alignment feature 418 can be, for example, a plastic, glass, or metal plate with features that engage with corresponding features on the top of a vessel 430 of reservoir system 420.

Reservoir system 420 supplies liquid, such as reagents, to droplet actuator 405. Reservoir system 420 is a pressure-assisted large-volume reservoir. Reservoir system 420 includes, for example, vessel 430 that holds a volume of liquid 432 (e.g., reagent solution). Vessel 430 can be, for example, a glass or plastic vessel. A pressure source 440 is fluidly coupled to vessel 430. Pressure source 440 is a constant pressure source. Pressure source 440 can be any type of positive pressure and/or negative pressure pump, such as, but not limited to, a syringe pump. Vessel 430 is fluidly coupled to the bottom of droplet actuator 405 via a sipper 434 arranged within vessel 430, wherein sipper 434 engages alignment feature 418 of droplet actuator 405 and an opening 436 of sipper 434 supplies loading port 416. Namely, the upper edge of vessel 430 and the upper edge of sipper 434 engage alignment feature 418. A septum or seal 438 is arranged around sipper 434 within vessel 430.

FIG. 4B shows a top down view of vessel 430 and sipper 434. FIG. 4C shows a plan view of the alignment feature 418-side of droplet actuator 405. FIG. 4A shows a cross-sectional view of droplet actuator 405 taken along line A-A of FIG. 4B. FIG. 4A also shows a cross-sectional view of vessel 430 and sipper 434 taken along line B-B of FIG. 4C. In operation, pressure source 440 provides just enough pressure to pump a droplet of liquid 432 through sipper 434, through loading port 416, and into droplet operations gap 414 of droplet actuator 405. In this configuration, vessel 430 can be located far from droplet actuator 405. Further, using pressure source 440, the pressure can be set precisely to form the desired meniscus to form the desired droplet. The pressure can be fixed to set the meniscus to the same place each time or feedback can be used to set the flow.

Figure 5:
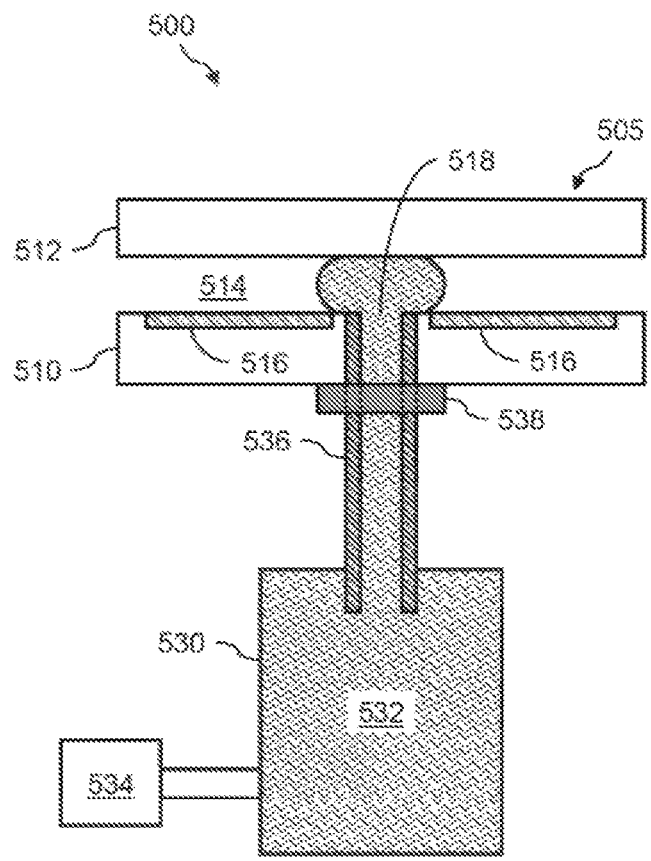
FIG. 5 illustrates a side view of another example of a microfluidics system that includes a pressure-assisted large-volume reservoir fluidly coupled to the bottom of a droplet actuator.

FIG. 5 illustrates a side view of another example of a microfluidics system 500 that includes a pressure-assisted large-volume reservoir fluidly coupled to the bottom of a droplet actuator. Namely, microfluidics system 500 includes a droplet actuator 505 used in combination with a pressure-assisted large-volume reservoir 530 fluidly coupled to the bottom of droplet actuator 505.

Droplet actuator 505 includes a bottom substrate 510 and a top substrate 512 that are separated by a droplet operations gap 514. Droplet operations gap 514 can contain filler fluid (not shown). Bottom substrate 510 may be, for example, a PCB or a glass substrate. Bottom substrate 510 may include an arrangement of droplet operations electrodes 516 (e.g., electrowetting electrodes). Top substrate 512 may be, for example, a glass or plastic substrate. Top substrate 512 may include a ground reference plane or electrode (not shown). A loading port 518 (e.g., a through-hole) is provided in bottom substrate 510. Loading port 518 is flanked by droplet operations electrodes 516.

Pressure-assisted large-volume reservoir 530 is a vessel that supplies liquid, such as reagents, to droplet actuator 505. Pressure-assisted large-volume reservoir 530 holds a volume of liquid 532 (e.g., reagent solution). A pressure source 540 is fluidly coupled to vessel 530. Pressure source 534 is a constant pressure source. Pressure source 534 can be any type of positive pressure and/or negative pressure pump, such as, but not limited to, a syringe pump. Pressure-assisted large-volume reservoir 530 is fluidly coupled to the bottom of droplet actuator 505 via a tube 536, wherein the end of tube 536 can be inserted directly into loading port 518 of droplet actuator 505 to supply liquid 532 into droplet operations gap 514. In one example, tube 536 is polytetrafluoroethylene (PTFE) tubing with OD (outer diameter)=1.6 mm and ID (inner diameter)=500-800 µm. A seal 538, such as an epoxy seal, is provided at the interface of tube 536 and bottom substrate 510 to prevent leakage. In this configuration, vessel 530 can be located far from droplet actuator 505. Again, pressure source 540 provides just enough pressure to pump a droplet of liquid 532 through loading port 518 and into droplet operations gap 514 of droplet actuator 505. Further, using pressure source 540, the pressure can be set precisely to form the desired meniscus to form the desired droplet. The pressure can be fixed to set the meniscus to the same place each time or feedback can be used to set the flow.

Figure 6:
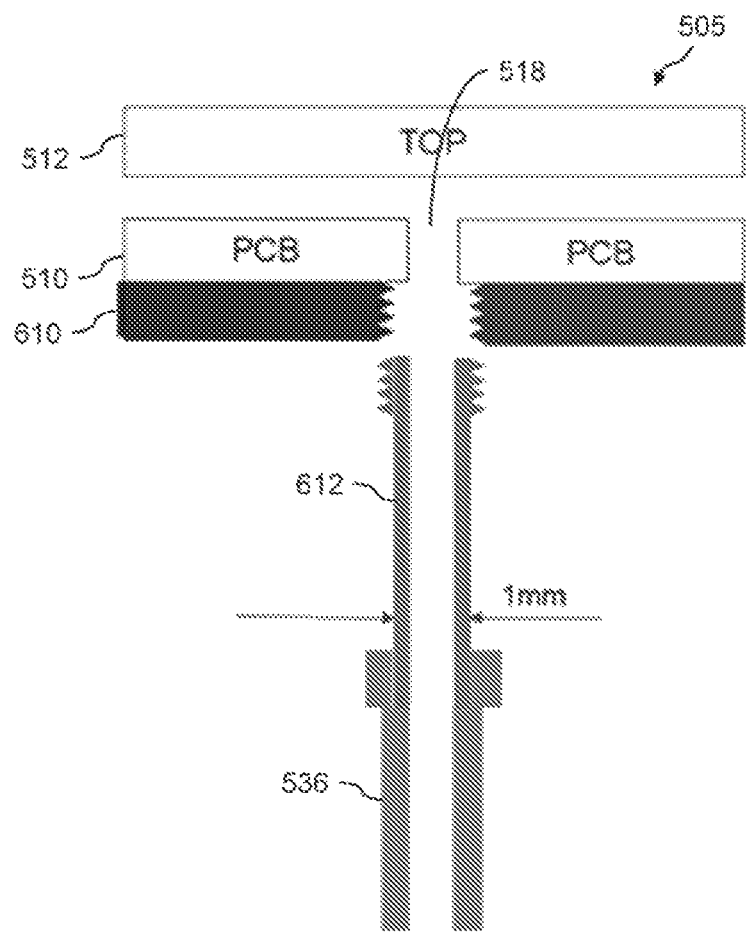
FIG. 6 shows a technique for providing an airtight seal between the tube and the bottom substrate in the bottom-coupled configuration of pressure-assisted reservoirs.

FIG. 6 shows another technique for providing an airtight seal between the tube (e.g., tube 536 of microfluidics system 500) and the bottom substrate (e.g., bottom substrate 510 of droplet actuator 505) in the bottom-coupled configuration of pressure-assisted reservoirs. In one example, a locking mechanism (e.g., Luer Lock) can be used to create the airtight seal. For example, a plate 610 (e.g., glass or plastic plate) may be provided against bottom substrate 510 of droplet actuator 505. Plate 610 includes the female connector portion of the Luer Lock mechanism. A locking tip 612 is fitted into the end of tube 536, wherein locking tip 612 is the male connector portion of the Luer Lock mechanism, which fits into the female connector portion of plate 610.

Figure 7A:
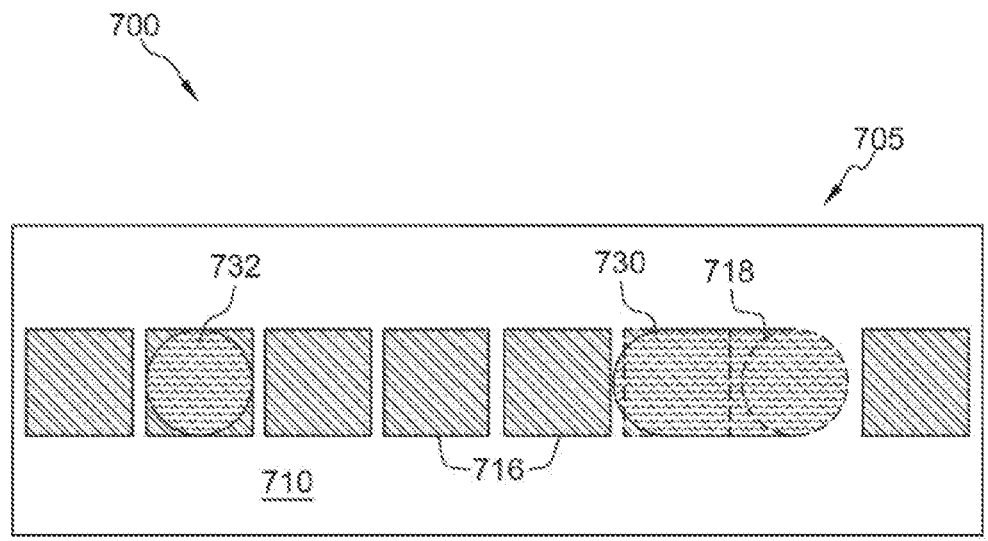
FIGS. 7A and 7B illustrate a top view and a side view, respectively, of an example of a microfluidics configuration that supports pressure-assisted reservoirs, wherein the pressure source is fluidly coupled to the bottom of a droplet actuator.
Figure 7B:
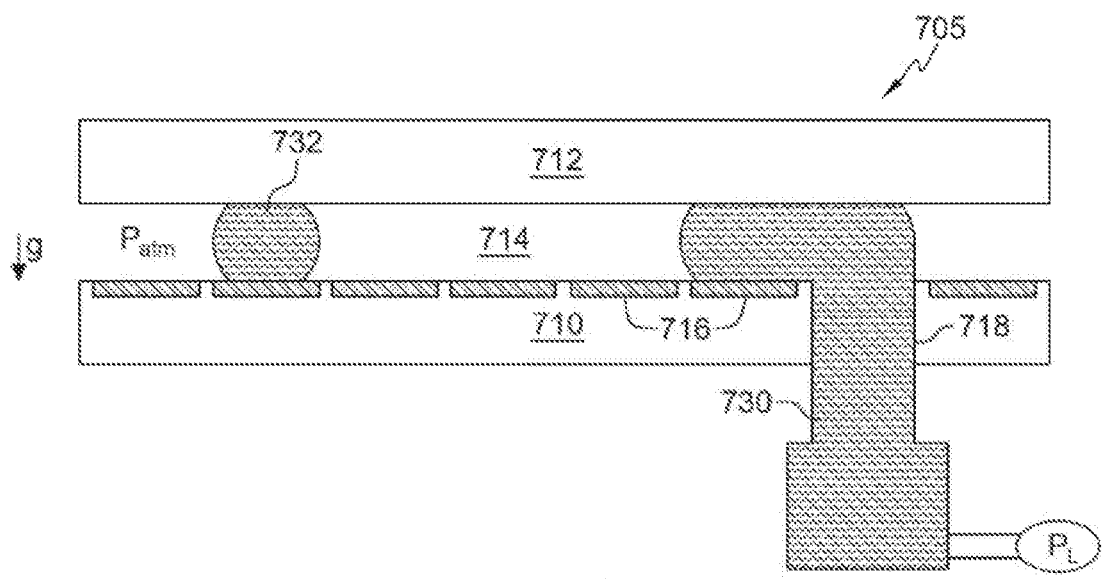

FIGS. 7A and 7B illustrate a top view and a side view, respectively, of an example of a microfluidics configuration 700 that supports pressure-assisted reservoirs, wherein the pressure source is fluidly coupled to the bottom of a droplet actuator. Namely, microfluidics configuration 700 is an example of a bottom-coupled pressure-assisted reservoir. For example, microfluidics configuration 700 includes one pressure source (e.g., a pressure source PL) supplying a droplet actuator 705. Pressure source PL can be any type of positive pressure and/or negative pressure pump, such as, but not limited to, a syringe pump.

Droplet actuator 705 includes a bottom substrate 710 and a top substrate 712 that are separated by a droplet operations gap 714. Droplet operations gap 714 can contain filler fluid (not shown). Bottom substrate 710 may be, for example, a PCB or a glass substrate. Bottom substrate 710 may include an arrangement of droplet operations electrodes 716 (e.g., electrowetting electrodes). Top substrate 712 may be, for example, a glass or plastic substrate. Top substrate 712 may include a ground reference plane or electrode (not shown). A loading port 718 (e.g., a through-hole) is provided in bottom substrate 710. Loading port 718 is flanked by droplet operations electrodes 716. In particular, loading port 718 is arranged along a line of droplet operations electrodes 716.

Pressure source PL as well as a supply of liquid, such as reagent solution 730, is fluidly coupled to loading port 718 of bottom substrate 710. In microfluidics configuration 700, arrangements of the on-board droplet operations electrodes 716 can serve as a small on-cartridge reservoir within droplet actuator 705. In operation, pressure source PL is maintained at substantially constant pressure and droplet operations electrodes 716 are actuated to form (dispense) droplets 732 via droplet operations. In microfluidics configuration 700, flooding will not occur due to pressure head considerations.

Figure 8:
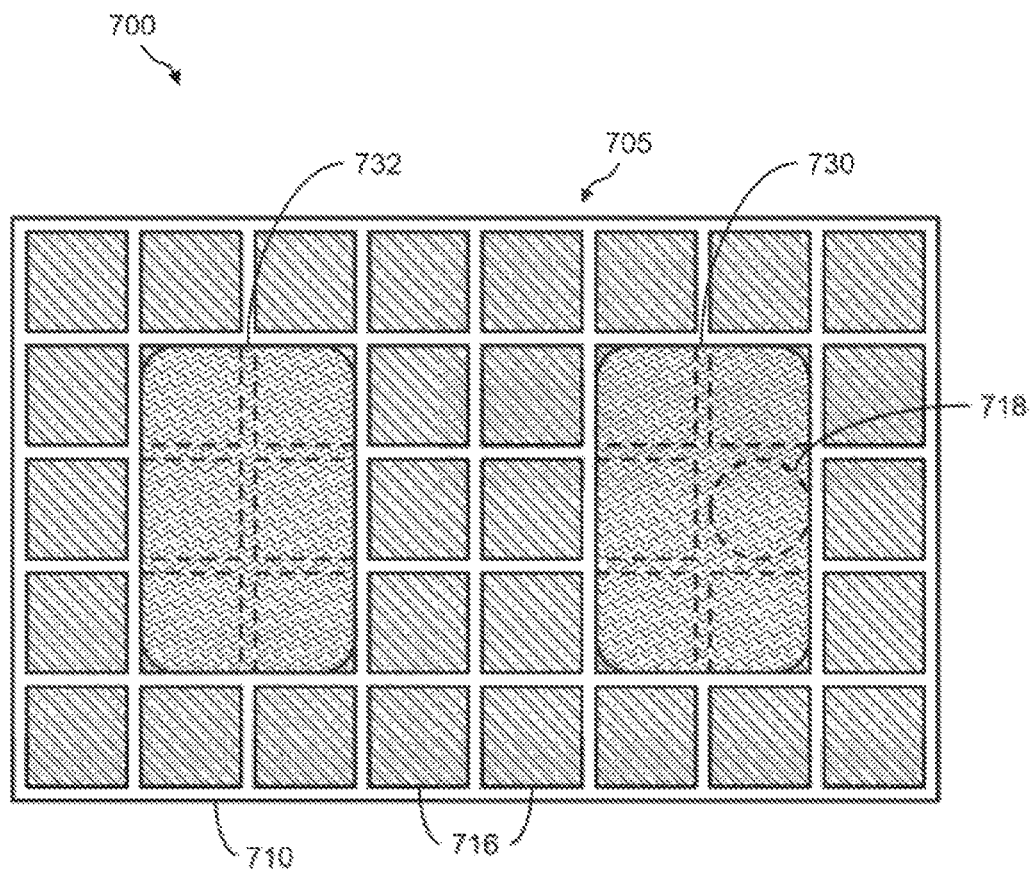
FIG. 8 illustrates a top view of another example of a microfluidics configuration, wherein the pressure source supplies an array of droplet operations electrodes.

Microfluidics configuration 700 is not limited to the pressure source PL supplying a single line or lane of electrodes only. Microfluidics configuration 700 can include other electrode configurations. For example, FIG. 8 illustrates a top view of another example of microfluidics configuration 700, wherein pressure source PL supplies an array of droplet operations electrodes 716. In this example, multiple droplet operations electrodes 716 can be activated to pull a large volume droplet of reagent solution 730 into droplet actuator 705. Using the array of droplet operations electrodes 716 and pressure source PL, droplets can be dispensed having a variety of volumes.

Further, microfluidics configuration 700 in not limited to bottom-coupled pressure-assisted reservoirs nor is it limited to one reservoir only, other configurations and/or features are possible. For example, microfluidics configuration 700 can include one or more bottom-coupled pressure-assisted reservoirs, one or more top-coupled pressure-assisted reservoirs, one or more side- or edge-coupled pressure-assisted reservoirs, and any combinations thereof. Examples of other configurations and features are described hereinbelow with reference to FIG. 9 through FIG. 13.

Figure 9:
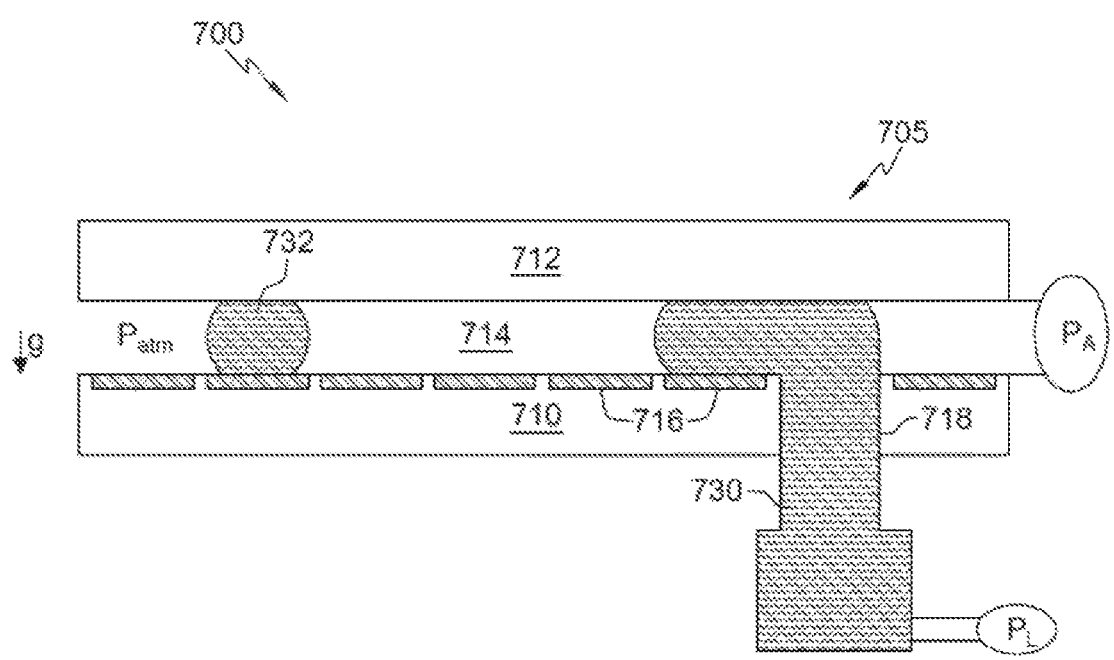
FIG. 9 illustrates a side view of another example of a microfluidics configuration that includes both a bottom-coupled pressure-assisted reservoir and a side- or edge-coupled pressure-assisted reservoir.

FIG. 9 illustrates a side view of another example of microfluidics configuration 700 that includes both a bottom-coupled pressure-assisted reservoir and a side- or edge-coupled pressure-assisted reservoir. Namely, microfluidics configuration 700 is substantially the same as microfluidics configuration 700 shown in FIGS. 7A and 7B except for the addition of a side- or edge-coupled pressure source PA. In this example, pressure source PA serves to assist droplet operations by shearing the droplet in the direction of the dispense operation (i.e., in the direction leading away from pressure source PA). Pressure source PA can be any type of positive pressure and/or negative pressure pump, such as, but not limited to, a syringe pump.

Figure 10:
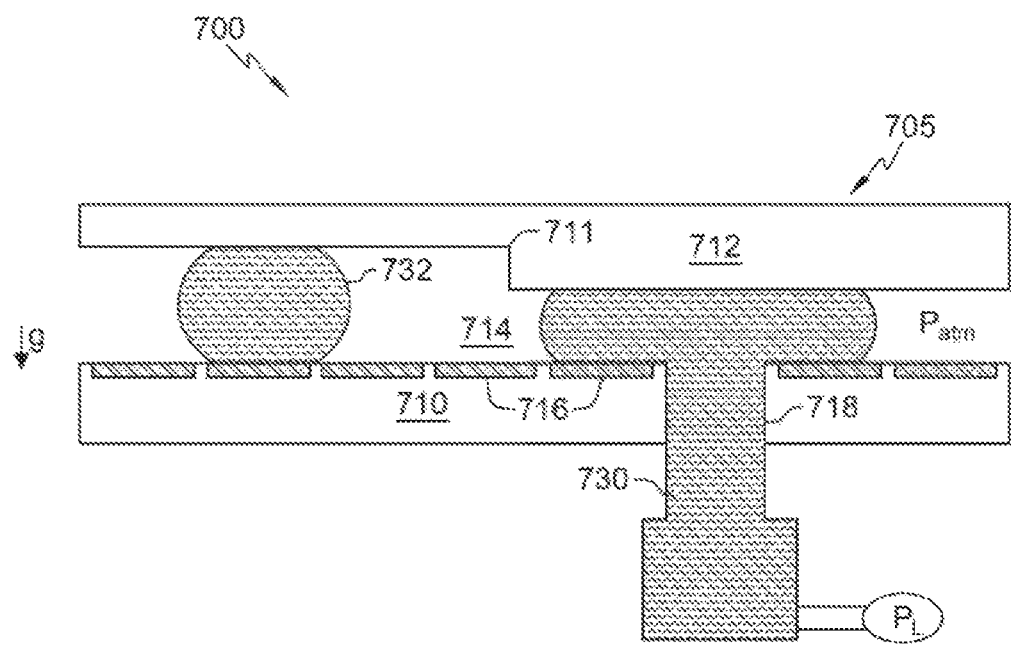
FIG. 10 and FIG. 11 illustrate side views of other examples of microfluidics configurations, wherein the gap height varies for further flow control at the loading port, which is pressure-assisted.
Figure 11:
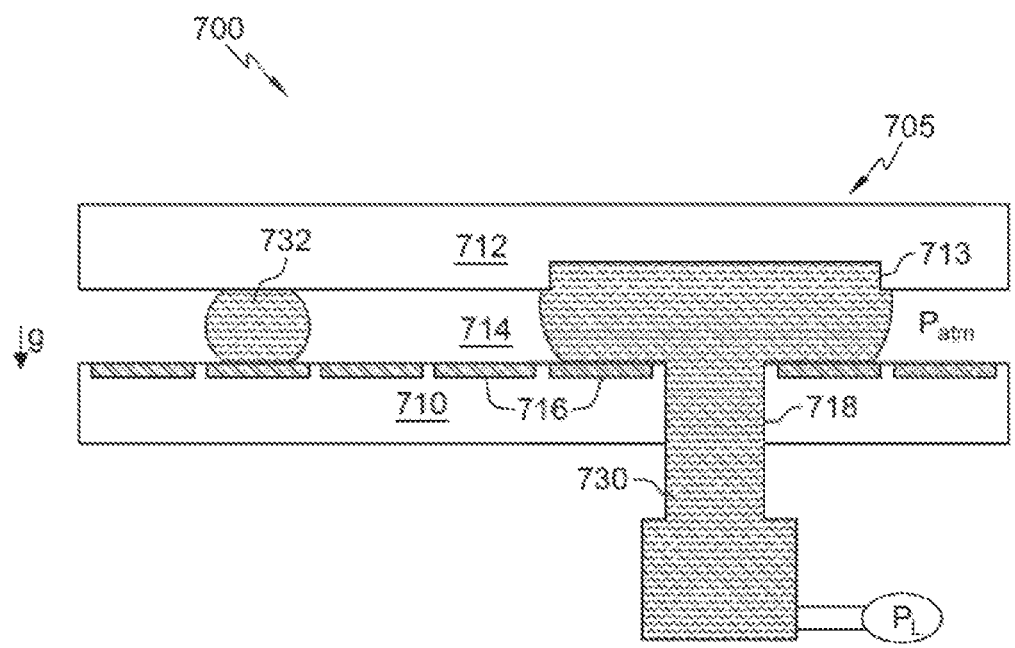

FIG. 10 and FIG. 11 illustrate side views of other examples of microfluidics configuration 700, wherein the gap height varies for further flow control at loading port 718, which is pressure-assisted. Referring now to FIG. 10, a step feature 711 is provided on the surface or top substrate 712 that is facing droplet operations gap 714. Because of step feature 711, the gap height at the location of loading port 718 is smaller than the gap height away from loading port 718. Accordingly, the smaller gap height results in more restricted flow at loading port 718 due to capillarity considerations. This geometry serves an additional measure of control over the flow of the fluid into droplet actuator 705, by restricting flow at loading port 718. Further, this geometry can be used in combination with side or edge, bottom, and/or top pressure-assisted reservoirs and can include one or more pressure sources PL.

Referring now to FIG. 11, a recessed region 713 is provided on the surface or top substrate 712 that is facing droplet operations gap 714. Namely, recessed region 713 is provided at the location of loading port 718 (the reagent source). Because of recessed region 713, the gap height at the location of loading port 718 is larger than the gap height away from loading port 718. Accordingly, the larger gap enables a larger volume of reagent solution 730 to be held locally on droplet actuator 705 and from which to dispense droplets. This geometry serves an additional measure of control over the flow of the fluid into droplet actuator 705, by enhancing flow at loading port 718. Further, due to capillarity considerations, the larger gap local to loading port 718 increases local flow (the opposite effect of FIG. 10 with a constricted gap).

With respect to FIGS. 10 and 11, the design and surface chemistry of a geometric valve at the interface of the reservoir (e.g., at loading port 718) can be optimized for each reagent. The local geometry, whether the gap is larger or smaller than the gap elsewhere in the electrowetting device, will influence capillarity leading to restricted or enhanced flow.

Figure 12:
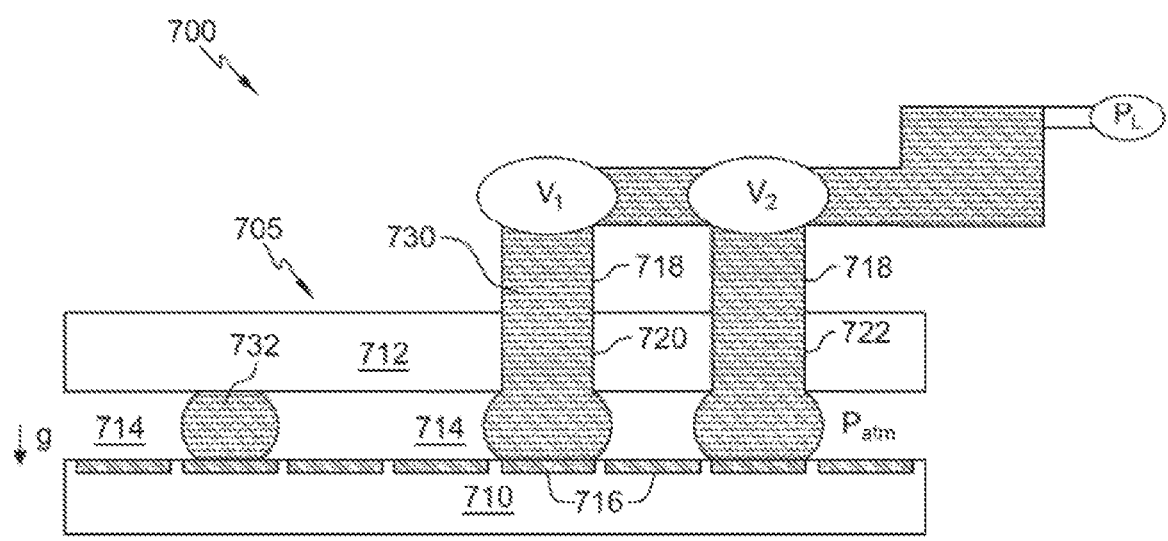
FIG. 12 illustrates a side view of an example of a microfluidics configuration that includes a top-coupled pressure-assisted reservoir.

FIG. 12 illustrates a side view of an example of microfluidics configuration 700 that includes a top-coupled pressure-assisted reservoir. In this example, loading port 718 is omitted from bottom substrate 710. Instead, two loading ports (e.g., loading ports 720, 722) are provided in top substrate 712 in relation to droplet operations electrodes 716. Loading ports 720, 722 are, for example, through-holes in top substrate 712.

Again, pressure source PL as well as a supply of reagent solution 730 is fluidly coupled to loading ports 720, 722 of top substrate 712. In this example, both loading ports 720, 722 are supplied in common by pressure source PL. Further, each of the loading ports 720, 722 has its own valve (e.g., valves V1, V2, respectively) to regulate individually the pressure from pressure source PL. In operation, pressure source PL is maintained at substantially constant pressure and droplet operations electrodes 716 are actuated to form (dispense) droplets 732 via droplet operations. In microfluidics configuration 700, flooding will not occur due to pressure head considerations.

Figure 13:
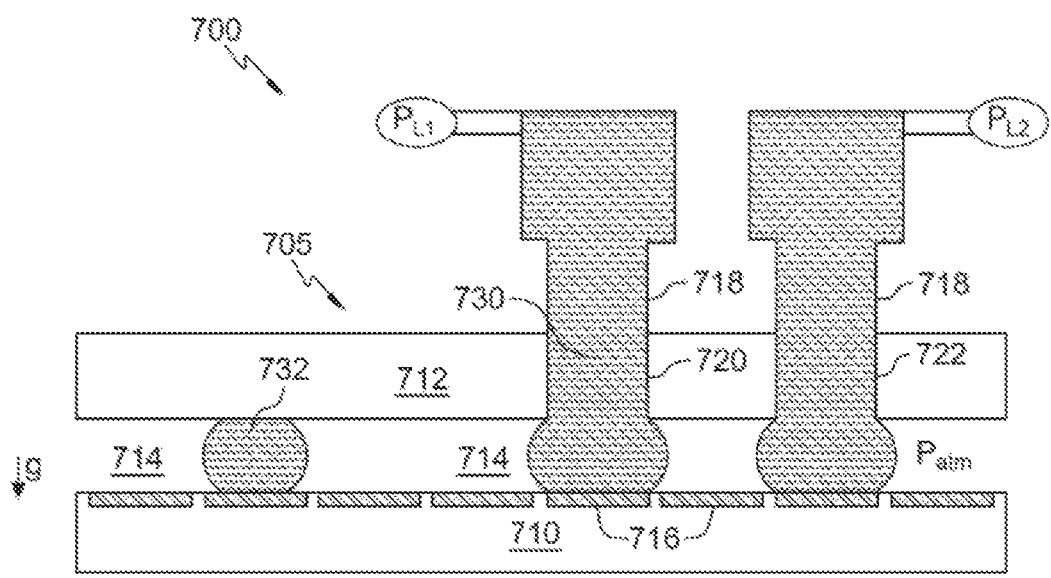
FIG. 13 illustrates a side view of another example of a microfluidics configuration that includes a top-coupled pressure-assisted reservoir.

FIG. 13 illustrates a side view of another example of microfluidics configuration 700 that includes a top-coupled pressure-assisted reservoir. In this example, the two loading ports (e.g., loading ports 720, 722) are supplied by separate pressure sources. Namely, in this example, microfluidics configuration 700 includes multiple pressure sources. For example, loading port 720 is supplied by a pressure source PL1 and loading port 722 is supplied by a pressure source PL2.

Referring now again to FIG. 7A through FIG. 13, in the microfluidics configurations 700, arrangements of the on-board droplet operations electrodes 716 can serve as small on-cartridge reservoirs within droplet actuator 705 and flooding will not occur due to pressure head considerations. Additionally, the configurations shown in FIG. 7A through FIG. 13 can be used with side, bottom, and/or top dispense embodiments, as well as with multiple pressure-assisted reservoirs. Further, the configurations shown in FIG. 7A through FIG. 13 can be supplied by common or unique pressure sources and can include valves at the junctions and/or junctions without valves. Additionally, the configurations shown in FIG. 7A through FIG. 13 can be used with any electrode configurations, such as, but not limited to, lines or lanes of electrodes and/or arrays of electrodes.

Figure 14:
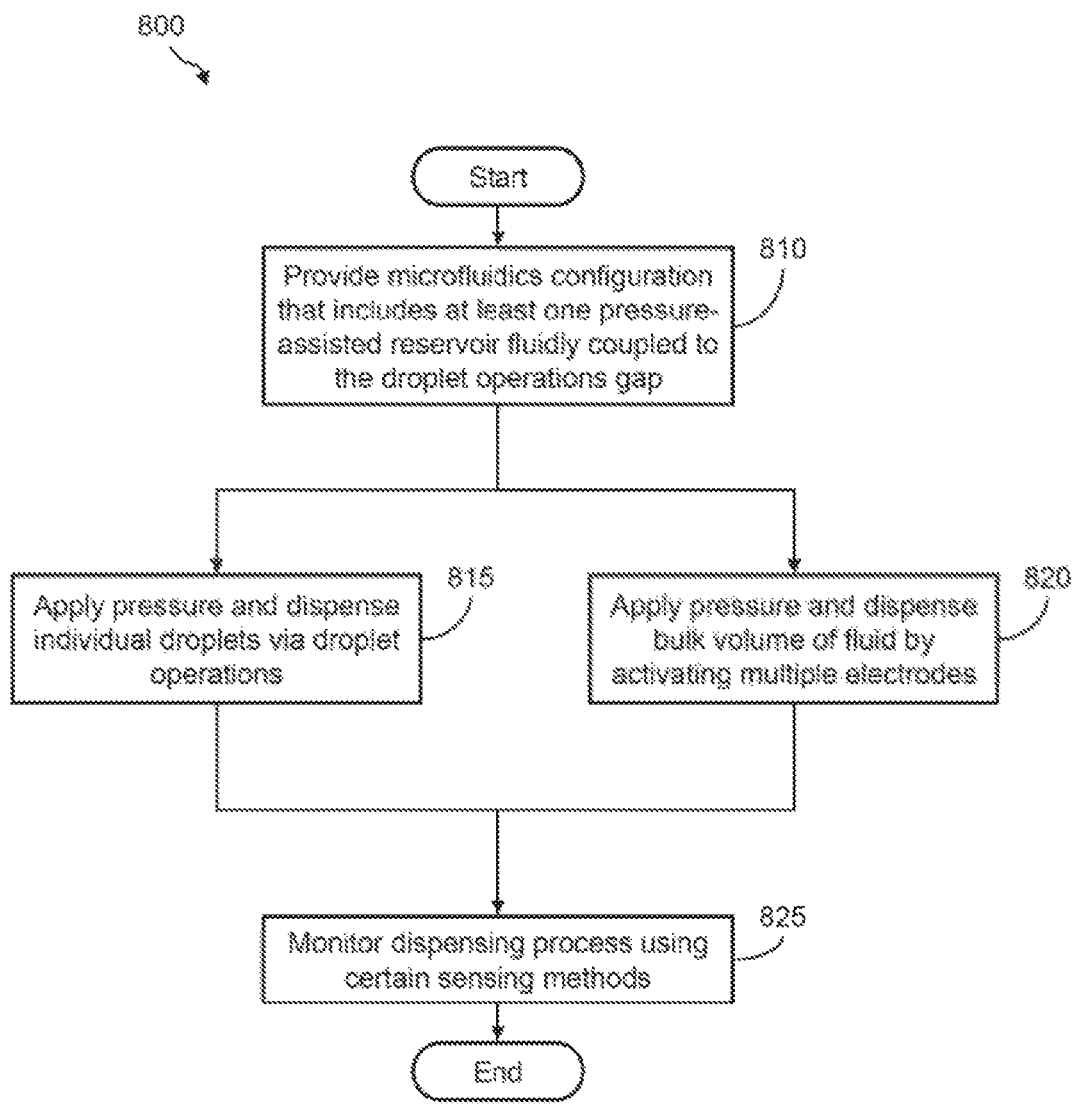
FIG. 14 illustrates a flow diagram of an example of a method of dispensing liquid using pressure-assisted reservoirs, such as those described in FIG. 7A through FIG. 13.

FIG. 14 illustrates a flow diagram of an example of a method 800 of dispensing liquid using pressure-assisted reservoirs, such as those described in FIG. 7A through FIG. 13. Method 800 may include, but is not limited to, the following steps.

At a step 810, a microfluidics configuration is provided that includes at least one pressure-assisted reservoir fluidly coupled to the droplet operations gap. For example, any of the configurations 700 shown in FIG. 7A through FIG. 13 that include droplet actuator 705 and one or more pressure sources are provided.

At a step 815, pressure is applied and individual droplets are dispensed via droplet operations. For example and referring now to FIGS. 7A and 7B, pressure is applied to reagent solution 730 via the pressure source PL that is coupled to loading port 718 and droplets 732 are dispensed via droplet operations in droplet actuator 705. Method 800 proceeds to step 825.

At a step 820, pressure is applied and a bulk volume of fluid is dispensed by activating multiple electrodes. For example and referring now to FIG. 8, pressure is applied to reagent solution 730 via the pressure source PL that is coupled to loading port 718. At the same time, multiple droplet operation electrodes 716 (e.g., droplet operation electrodes 716) surrounding loading port 718 are activated to dispense large-volume droplets 732 across the array of droplet operation electrodes 716 in droplet actuator 705. Method 800 proceeds to step 825.

In method 800, either or both steps 815 and 820 can be performed.

At a step 825, the droplet dispensing process is monitored using certain sensing methods. For example, optical or impedance sensing can be coupled to the pressure source and/or the electrowetting instrumentation to ensure that a minimum volume of reagent is held within, for example, droplet actuator 705 prior to dispense. Optical or impedance sensing can also be used to ensure that discrete drops of the appropriate volume are dispensed.

Figure 15:
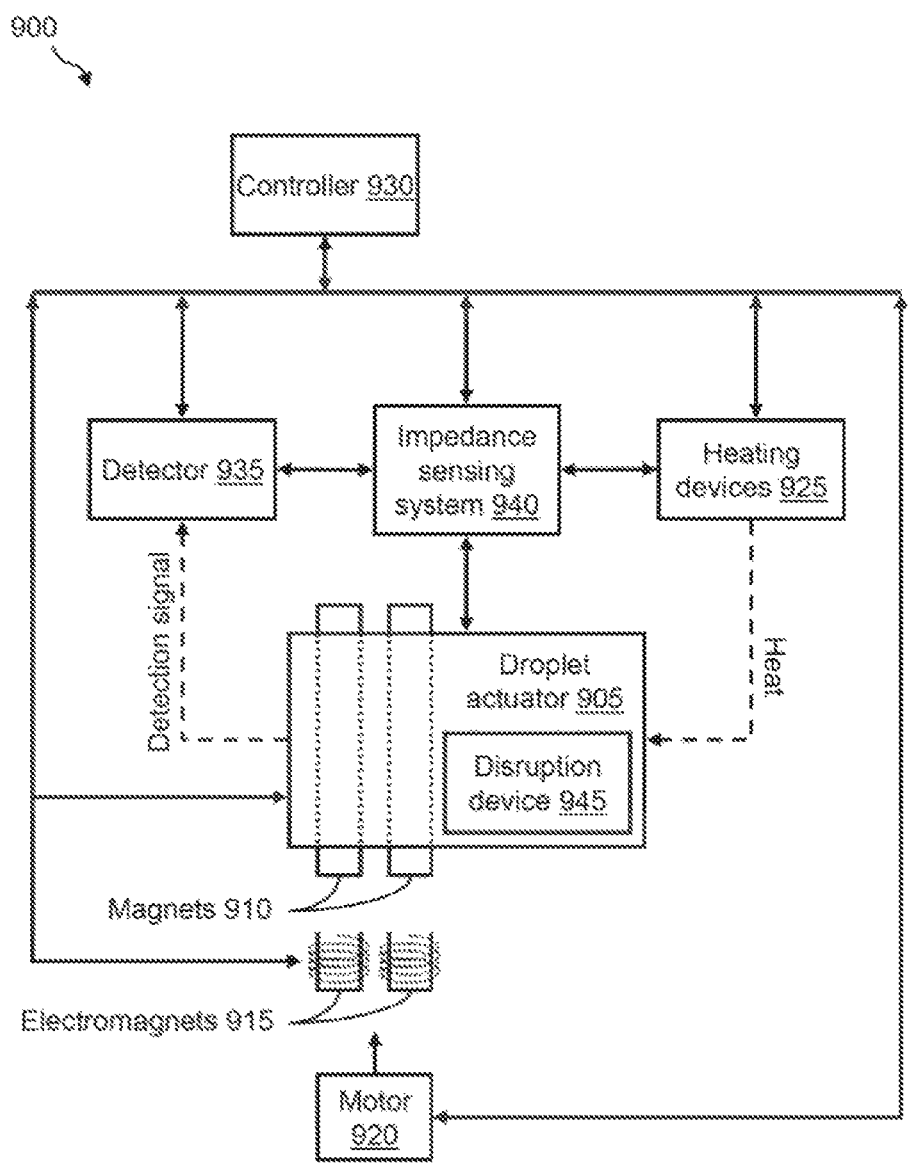
FIG. 15 illustrates a functional block diagram of an example of a microfluidics system that includes a droplet actuator, which is one example of a fluidics cartridge.

FIG. 15 illustrates a functional block diagram of an example of a microfluidics system 900 that includes a droplet actuator 905, which is one example of a fluidics cartridge. Digital microfluidic technology conducts droplet operations on discrete droplets in a droplet actuator, such as droplet actuator 905, by control of their surface tension, e.g., electrical control by electrowetting. The droplets may be sandwiched between two substrates of droplet actuator 905, a bottom substrate and a top substrate separated by a droplet operations gap. The bottom substrate may include an arrangement of electrically addressable electrodes. The top substrate may include a reference electrode plane made, for example, from conductive ink or ITO. The bottom substrate and the top substrate may be coated with a hydrophobic material. Droplet operations are conducted in the droplet operations gap. The space around the droplets (i.e., the gap between bottom and top substrates) may be filled with an immiscible inert fluid, such as silicone oil, to prevent evaporation of the droplets and to facilitate their transport within the device. In other embodiments, no silicone oil is used and the droplet is surrounded by air. Other droplet operations may be effected by varying the patterns of voltage activation; examples include merging, splitting, mixing, and dispensing of droplets.

Droplet actuator 905 may be designed to fit onto an instrument deck (not shown) of microfluidics system 900. The instrument deck may hold droplet actuator 905 and house other droplet actuator features, such as, but not limited to, one or more magnets and one or more heating devices. For example, the instrument deck may house one or more magnets 910, which may be permanent magnets. Optionally, the instrument deck may house one or more electromagnets 915. Magnets 910 and/or electromagnets 915 are positioned in relation to droplet actuator 905 for immobilization of magnetically responsive beads. Optionally, the positions of magnets 910 and/or electromagnets 915 may be controlled by a motor 920. Additionally, the instrument deck may house one or more heating devices 925 for controlling the temperature within, for example, certain reaction and/or washing zones of droplet actuator 905. In one example, heating devices 925 may be heater bars that are positioned in relation to droplet actuator 905 for providing thermal control thereof.

A controller 930 of microfluidics system 900 is electrically coupled to various hardware components of the apparatus set forth herein, such as droplet actuator 905, electromagnets 915, motor 920, and heating devices 925, as well as to a detector 935, an impedance sensing system 940, and any other input and/or output devices (not shown). Controller 930 controls the overall operation of microfluidics system 900. Controller 930 may, for example, be a general purpose computer, special purpose computer, personal computer, or other programmable data processing apparatus. Controller 930 serves to provide processing capabilities, such as storing, interpreting, and/or executing software instructions, as well as controlling the overall operation of the system. Controller 930 may be configured and programmed to control data and/or power aspects of these devices. For example, in one aspect, with respect to droplet actuator 905, controller 930 controls droplet manipulation by activating/deactivating electrodes.

In one example, detector 935 may be an imaging system that is positioned in relation to droplet actuator 905. In one example, the imaging system may include one or more light-emitting diodes (LEDs) (i.e., an illumination source) and a digital image capture device, such as a charge-coupled device (CCD) camera. Detection can be carried out using an apparatus suited to a particular reagent or label in use. For example, an optical detector such as a fluorescence detector, absorbance detector, luminescence detector or the like can be used to detect appropriate optical labels. Systems designed for array-based detection may be particularly useful. For example, optical systems for use with the methods set forth herein may be constructed to include various components and assemblies as described in Banerjee et al., U.S. Pat. No. 8,241,573, entitled "Systems and Devices for Sequence by Synthesis Analysis," issued on Aug. 14, 2012; Feng et al., U.S. Pat. No. 7,329,860, entitled "Confocal Imaging Methods and Apparatus," issued on Feb. 12, 2008; Feng et al., U.S. Pat. No. 8,039,817, entitled "Compensator for Multiple Surface Imaging," issued on Oct. 18, 2011; Feng et al., U.S. Patent Pub. No. 20090272914, entitled "Compensator for Multiple Surface Imaging," published on Nov. 5, 2009; and Reed et al., U.S. Patent Pub. No. 20120270305, entitled "Systems, Methods, and Apparatuses to Image a Sample for Biological or Chemical Analysis," published on Oct. 25, 2012, the entire disclosures of which are incorporated herein by reference. For example, optical systems for use with the methods set forth herein may be constructed to include various components and assemblies.

Impedance sensing system 940 may be any circuitry for detecting impedance at a specific electrode of droplet actuator 905. In one example, impedance sensing system 940 may be an impedance spectrometer. Impedance sensing system 940 may be used to monitor the capacitive loading of any electrode, such as any droplet operations electrode, with or without a droplet thereon. For examples of suitable capacitance detection techniques, see Sturmer et al., International Patent Pub. No. WO/2008/101194, entitled "Capacitance Detection in a Droplet Actuator," published on Dec. 30, 2009; and Kale et al., International Patent Pub. No. WO/2002/080822, entitled "System and Method for Dispensing Liquids," published on Feb. 26, 2004, the entire disclosures of which are incorporated herein by reference.

Droplet actuator 905 may include disruption device 945. Disruption device 945 may include any device that promotes disruption (lysis) of materials, such as tissues, cells and spores in a droplet actuator. Disruption device 945 may, for example, be a sonication mechanism, a heating mechanism, a mechanical shearing mechanism, a bead beating mechanism, physical features incorporated into the droplet actuator 905, an electric field generating mechanism, a thermal cycling mechanism, and any combinations thereof. Disruption device 945 may be controlled by controller 930.

As will be appreciated by one skilled in the art, aspects of this application may be embodied as a system, method or computer program product. Accordingly, aspects of this application may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of this application may take the form of a computer program product embodied in one or more non-transitory computer readable storage medium(s) having computer readable program code embodied thereon.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory tangible medium that can contain or store a program for use by or in connection with an instruction execution system, apparatus, or device.

Figure 16:
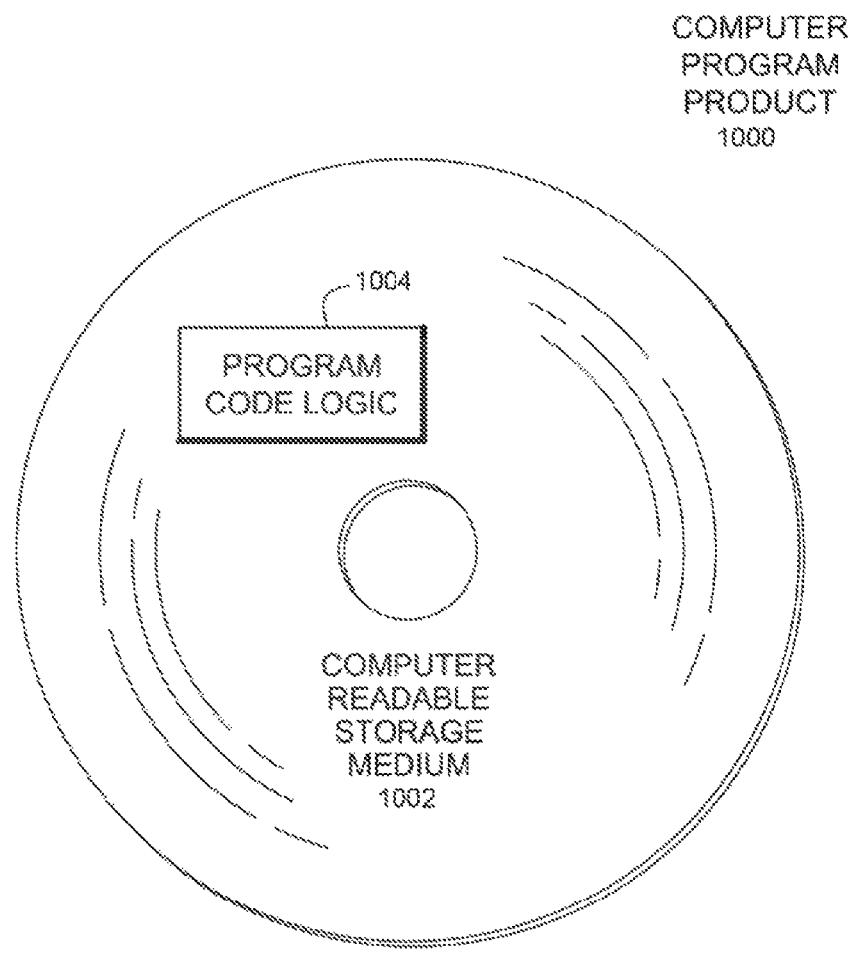
FIG. 16 illustrates one example of a computer program product including, for instance, one or more non-transitory computer readable storage media to store computer readable program code means or logic thereon to provide and facilitate one or more aspects of this application.

Referring now to FIG. 16, in one example, a computer program product 1000 includes, for instance, one or more non-transitory computer readable storage media 1002 to store computer readable program code means or logic 1004 thereon to provide and facilitate one or more aspects of this application.

Program code for carrying out operations of the methods and apparatus set forth herein may be written in an object oriented programming language such as Java, Smalltalk, C++ or the like. However, the program code for carrying out operations of the methods and apparatus set forth herein may also be written in conventional procedural programming languages, such as the "C" programming language or similar programming languages. The program code may be executed by a processor, application specific integrated circuit (ASIC), or other component that executes the program code. The program code may be simply referred to as a software application that is stored in memory (such as the computer readable medium discussed above). The program code may cause the processor (or any processor-controlled device) to produce a graphical user interface ("GUI"). The graphical user interface may be visually produced on a display device, yet the graphical user interface may also have audible features. The program code, however, may operate in any processor-controlled device, such as a computer, server, personal digital assistant, phone, television, or any processor-controlled device utilizing the processor and/or a digital signal processor.

The program code may locally and/or remotely execute. The program code, for example, may be entirely or partially stored in local memory of the processor-controlled device. The program code, however, may also be at least partially remotely stored, accessed, and downloaded to the processor-controlled device. A user's computer, for example, may entirely execute the program code or only partly execute the program code. The program code may be a stand-alone software package that is at least partly on the user's computer and/or partly executed on a remote computer or entirely on a remote computer or server. In the latter scenario, the remote computer may be connected to the user's computer through a communications network.

The methods and apparatus set forth herein may be applied regardless of networking environment. The communications network may be a cable network operating in the radio-frequency domain and/or the Internet Protocol (IP) domain. The communications network, however, may also include a distributed computing network, such as the Internet (sometimes alternatively known as the "World Wide Web"), an intranet, a local-area network (LAN), and/or a wide-area network (WAN). The communications network may include coaxial cables, copper wires, fiber optic lines, and/or hybrid-coaxial lines. The communications network may even include wireless portions utilizing any portion of the electromagnetic spectrum and any signaling standard (such as the IEEE 802 family of standards, GSM/CDMA/TDMA or any cellular standard, and/or the ISM band). The communications network may even include powerline portions, in which signals are communicated via electrical wiring. The methods and apparatus set forth herein may be applied to any wireless/wireline communications network, regardless of physical componentry, physical configuration, or communications standard(s).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any flowcharts and/or block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The data processing system may also include one or more databases for structured storage and retrieval of data. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In a first aspect, disclosed above is a system. The system includes a droplet actuator having a droplet-operation gap between top and bottom substrates, reservoir(s) external to and coupled to the droplet actuator, the reservoir(s) being sized for a large-volume fluid, and pressure source(s) external to the droplet actuator and coupled to the reservoir(s).

In one example, the pressure source(s) may include, for example, a constant pressure source.

In one example, the pressure source(s) of the droplet actuator of the system of the first aspect may include, for example, positive pressure source(s) and/or negative pressure source(s).

In one example, one or more reservoirs of the reservoir(s) of the system of the first aspect may be, for example, connected to the droplet actuator, a seal for at least one of the one or more reservoirs may include, for example, a male seal portion and a female seal portion, one of the male seal portion and the female seal portion being located at a bottom of the droplet actuator, and the other of the male seal portion and the female seal portion being coupled to the at least one of the one or more reservoirs.

The system of the first aspect may further include, for example, conduit(s) coupling the droplet actuator and the reservoir(s), a seal being located at the droplet actuator.

In one example, a removed portion of the top substrate of the system of the first aspect may, for example, create an abrupt increase in a height of the droplet-operation gap at side edges of the top substrate corresponding to the removed portion.

In one example, the reservoir(s) and the pressure source(s) may be, for example, bottom-coupled to the droplet actuator. In one example, additional pressure source(s) may be, for example, side-coupled to the droplet actuator.

In one example, reservoir(s) and the pressure source(s) of the system of the first aspect may be, for example, top-coupled to the droplet actuator.

In one example, the droplet actuator of the system of the first aspect may further include, for example, inlet(s) for fluid, and the system may further include, for example, valve(s) coupled to the inlet(s) to control a flow of fluid(s) incoming to the droplet actuator.

In a second aspect, disclosed above is a method. The method includes filling reservoir(s) of a system with a large volume of fluid(s), the system further including a droplet actuator having a droplet-operation gap between top and bottom substrates thereof, and pressure source(s) external to the droplet actuator and coupled to the reservoir(s), the reservoir(s) being externally coupled to the droplet actuator and sized for a large-volume fluid, and dispensing droplet(s) of the fluid(s) to the droplet-operation gap using the pressure source(s) as part of performing droplet operation(s).

In one example, pressure source(s) may include, for example, one or more positive pressure sources, the dispensing including pushing the droplet(s) from the one or more of the at least one reservoir to the droplet-operation gap.

In one example, the pressure source(s) of the system in the method of the second aspect may include, for example, constant pressure source(s), and the dispensing may include, for example, using the constant pressure source(s) to dispense the droplet(s).

In one example, a removed portion of the top substrate of the system in the method of the second aspect may, for example, create an abrupt increase in a height of the droplet-operation gap at side edges of the top substrate corresponding to the removed portion, the droplet-operation gap including an gap under the removed portion situated between the top substrate and the bottom substrate, and the dispensing including dispensing the droplet(s) to the droplet-operation gap outside the gap under the removed portion.

In one example, one or more of the pressure source(s) and one or more reservoirs of the reservoir(s) of the system in the method of the second aspect may be, for example, bottom-coupled to the droplet actuator, and the dispensing includes dispensing the droplet(s) to the droplet-operation gap using the one or more pressure sources and the one or more reservoirs. In one example, the pressure source(s) may further include, for example, one or more pressure sources side-coupled to the droplet actuator, and the dispensing includes dispensing the droplet(s) to the droplet-operation gap also using the one or more pressure sources side-coupled to the droplet actuator.

In one example, the pressure source(s) of the system in the method of the second aspect may include, for example, one or more pressure sources top-coupled to the droplet actuator, and the dispensing may include dispensing the droplet(s) to the droplet-operation gap using the one or more pressure sources top-coupled to the droplet actuator.

In one example, the droplet actuator of the system in the method of the second aspect may include, for example, an electrowetting-based droplet actuator, electrodes may be, for example, situated in the bottom substrate and another electrode(s) may be, for example, associated with the top substrate, the electrodes of the bottom substrate may include, for example, an array(s) of at least two electrodes, and the dispensing may include, for example, activating the electrodes of the bottom substrate and dispensing at least two droplets onto the bottom substrate over the array(s).

In one example, the method of the second aspect may further include monitoring one or more aspects of the dispensing.

In a third aspect, disclosed above is a method. The method includes coupling a droplet actuator to reservoir(s) externally coupled to the droplet actuator and sized for a large-volume fluid, filling one or more of the reservoir(s) with a large-volume fluid, activating the droplet actuator, dispensing, after the activating, droplet(s) of the large-volume fluid to an inlet of a droplet-operation gap of the droplet actuator using pressure, the dispensing including controlling a flow of the large-volume fluid into the inlet using valve(s) coupled to the inlet, the dispensing including monitoring one or more aspects of the dispensing, and moving the at least one droplet along the droplet-operation gap toward an outlet of the droplet actuator.

While several aspects of this application have been described and depicted herein, alternative aspects may be effected by those skilled in the art to accomplish the same objectives. Accordingly, it is intended by the appended claims to cover all such alternative aspects as fall within the true spirit and scope of the application.

It should be appreciated that all combinations of the foregoing concepts (provided such concepts are not mutually inconsistent) are contemplated as being part of the inventive subject matter disclosed herein. In particular, all combinations of claimed subject matter appearing at the end of this application are contemplated as being part of the inventive subject matter disclosed herein.

The invention claimed is:

1. A system, comprising:
a droplet actuator having a top substrate, a bottom substrate, and a droplet-operation gap between the top and bottom substrates;
at least one reservoir external to and coupled to the droplet actuator, the at least one reservoir being sized for a large-volume fluid;
at least one pressure source external to the droplet actuator and coupled to the at least one reservoir such that the at least one pressure source is configured to pressurize the large-volume fluid in the at least one reservoir and drive the pressurized large-volume fluid from the at least one reservoir to the droplet-operation gap via one or more loading ports formed in the droplet actuator; and
a spacer positioned in the droplet-operation gap adjacent an inlet of the droplet actuator to shrink the inlet vertically and/or horizontally.

2. The system of claim 1, wherein the at least one pressure source comprises a constant pressure source.

3. The system of claim 1, wherein the at least one pressure source comprises at least one of one or more positive pressure sources and one or more negative pressure sources.

4. The system of claim 1, wherein one or more reservoirs of the at least one reservoir are connected to the droplet actuator, and wherein a seal for at least one of the one or more reservoirs comprises a male seal portion and a female seal portion, one of the male seal portion and the female seal portion being located at a bottom of the droplet actuator, and the other of the male seal portion and the female seal portion being coupled to the at least one of the one or more reservoirs.

5. The system of claim 1, further comprising at least one conduit coupling the droplet actuator and the at least one reservoir, wherein a seal is located at the droplet actuator.

6. The system of claim 1, wherein a removed portion of the top substrate creates an abrupt increase in a height of the droplet-operation gap at side edges of the top substrate corresponding to the removed portion.

7. The system of claim 1, wherein the droplet actuator further comprises at least one inlet for fluid, the system further comprising at least one valve coupled to the at least one inlet to control a flow of one or more fluids incoming to the droplet actuator.

8. The system of claim 1, wherein the one or more loading ports are formed in the top substrate or the bottom substrate.

9. The system of claim 1, wherein the at least one reservoir is coupled to the droplet actuator via a connector.

10. The system of claim 9, wherein the connector comprises a tube, a sipper, or a locking tip.

11. The system of claim 1, wherein the top substrate or the bottom substrate includes at least one stepped portion, such that the droplet-operation gap has a first height at a first location along the droplet actuator and a second height at a second location along the droplet actuator, the second height being different from the first height.

12. A method, comprising:
filling at least one reservoir of a system with a large volume of one or more fluids, wherein the system further comprises:
a droplet actuator having a top substrate, a bottom substrate, and a droplet-operation gap between the top and bottom substrates;
at least one pressure source external to the droplet actuator and coupled to the at least one reservoir, and wherein the at least one reservoir is externally coupled to the droplet actuator; and
a spacer positioned in the droplet-operation gap adjacent an inlet of the droplet actuator to shrink the inlet vertically and/or horizontally;
pressurizing the one or more fluids in the at least one reservoir using the at least one pressure source; and
dispensing at least one droplet of the pressurized one or more fluids to the droplet-operation gap using the at least one pressure source as part of performing at least one droplet operation.

13. The method of claim 12, wherein the at least one pressure source comprises one or more positive pressure sources, and wherein the dispensing comprises pushing the at least one droplet from one or more of the at least one reservoir to the droplet-operation gap.

14. The method of claim 12, wherein the at least one pressure source comprises one or more constant pressure sources, and wherein the dispensing comprises using the one or more constant pressure sources to dispense the at least one droplet.

15. The method of claim 12, wherein a removed portion of the top substrate creates an abrupt increase in a height of the droplet-operation gap at side edges of the top substrate corresponding to the removed portion, wherein the droplet-operation gap comprises a gap under the removed portion situated between the top substrate and the bottom substrate, and wherein the dispensing comprises dispensing the at least one droplet to the droplet-operation gap outside the gap under the removed portion.

16. The method of claim 12, wherein one or more pressure sources of the at least one pressure source and one or more reservoirs of the at least one reservoir are bottom-coupled to the droplet actuator, and wherein the dispensing comprises dispensing the at least one droplet to the droplet-operation gap using the one or more pressure sources and the one or more reservoirs.

17. The method of claim 16, wherein the at least one pressure source further comprises one or more pressure sources side-coupled to the droplet actuator, and wherein the dispensing comprises dispensing the at least one droplet to the droplet-operation gap also using the one or more pressure sources side-coupled to the droplet actuator.

18. The method of claim 12, wherein the at least one pressure source comprises one or more pressure sources top-coupled to the droplet actuator, and wherein the dispensing comprises dispensing the at least one droplet to the droplet-operation gap using the one or more pressure sources top-coupled to the droplet actuator.

19. The method of claim 12, wherein the droplet actuator comprises an electrowetting-based droplet actuator, wherein a plurality of electrodes are situated in the bottom substrate and at least one electrode is associated with the top substrate, the plurality of electrodes comprising at least one array of at least two electrodes, and wherein the dispensing comprises activating the plurality of electrodes and dispensing at least two droplets onto the bottom substrate over the array.

20. A method, comprising:
coupling a droplet actuator to at least one reservoir externally coupled to the droplet actuator and sized for a large-volume fluid, the droplet actuator having a top substrate, a bottom substrate, and a droplet-operation gap between the top and bottom substrates;
coupling at least one pressure source to the droplet actuator, the at least one pressure source external to the at least one reservoir;

filling one or more of the at least one reservoir with the large-volume fluid;

activating the droplet actuator;

pressurizing the large-volume fluid in the at least one reservoir using the at least one pressure source;

dispensing, after the activating, at least one droplet of the pressurized large-volume fluid to an inlet of the droplet-operation gap of the droplet actuator using pressure provided by the at least one pressure source, the dispensing comprising controlling a flow of the large-volume fluid into the inlet using at least one valve coupled to the inlet, wherein the dispensing includes monitoring one or more aspects of the dispensing;

moving the at least one droplet along the droplet-operation gap toward an outlet of the droplet-operation gap; and positioning a spacer in the droplet-operation gap adjacent the inlet of the droplet actuator to shrink the inlet vertically and/or horizontally.

21. The method of claim 20, further comprising adjusting the pressure provided by the at least one pressure source to maintain a specified meniscus for the at least one droplet.

* * * * *